United States Patent
Wu et al.

(10) Patent No.: US 11,985,700 B2
(45) Date of Patent: May 14, 2024

(54) METHOD FOR RADIO LINK MONITORING ON UNLICENSED SPECTRUM AND COMMUNICATIONS APPARATUS

(71) Applicant: Huawei Technologies Co., Ltd., Shenzhen (CN)

(72) Inventors: Ji Wu, Shanghai (CN); Jianqin Liu, Beijing (CN); Jun Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 484 days.

(21) Appl. No.: 17/240,603

(22) Filed: Apr. 26, 2021

(65) Prior Publication Data
US 2021/0251001 A1    Aug. 12, 2021

Related U.S. Application Data

(63) Continuation of application No. PCT/CN2019/113403, filed on Oct. 25, 2019.

(30) Foreign Application Priority Data

Oct. 26, 2018   (CN) .......................... 201811261994.7

(51) Int. Cl.
*H04W 72/04*   (2023.01)
*H04L 5/00*   (2006.01)
(Continued)

(52) U.S. Cl.
CPC ....... *H04W 74/0808* (2013.01); *H04L 5/0048* (2013.01); *H04W 16/14* (2013.01)

(58) Field of Classification Search
CPC .. H04L 5/0048; H04L 5/006; H04W 74/0808; H04W 74/006; H04W 76/19
See application file for complete search history.

(56) References Cited

U.S. PATENT DOCUMENTS

| | | | |
|---|---|---|---|
| 2012/0057683 A1* | 3/2012 | Liik | H04M 3/42195 379/32.01 |
| 2017/0223561 A1 | 8/2017 | Radulescu et al. | |
| 2018/0007688 A1* | 1/2018 | Fu | H04W 72/23 |

FOREIGN PATENT DOCUMENTS

| | | |
|---|---|---|
| CN | 104540158 A | 4/2015 |
| CN | 105101446 A | 11/2015 |

(Continued)

OTHER PUBLICATIONS

"RLM/RLF measurement on NR-U," 3GPP TSG-RAN WG2 Meeting #AH-1807, Montreal, Canada, R2-1810214, Total 4 pages, 3rd Generation Partnership Project, Valbonne, France (Jul. 2-6, 2018).

(Continued)

*Primary Examiner* — Jamal Javaid
(74) *Attorney, Agent, or Firm* — Leydig, Voit & Mayer, Ltd.

(57) ABSTRACT

A method for radio link monitoring on an unlicensed spectrum and a communications apparatus is provided. The method includes: A terminal device determines one or more channel occupancy times (COTs). The terminal device detects one or more downlink reference signals within the one or more COTs. The terminal device determines, based on the downlink reference signal detected within the one or more COTs, whether a channel needs to be reconnected. According to the method for radio link monitoring on an unlicensed spectrum that is provided in this application, accuracy of radio link monitoring performed on an unlicensed spectrum can be ensured, precision of a result of the radio link monitoring can be improved, and a more accurate result of the radio link monitoring can be obtained, thereby improving communication efficiency and communication quality.

20 Claims, 14 Drawing Sheets

(51) Int. Cl.
    *H04W 16/14*     (2009.01)
    *H04W 74/0808*   (2024.01)

(56)            References Cited

FOREIGN PATENT DOCUMENTS

CN      106797571 A     5/2017
CN      108605303 A     9/2018

OTHER PUBLICATIONS

Sony, "Considerations on initial access and mobility for NR unlicensed operations," 3GPP TSG RAN WG1 Meeting #94bis, Chengdu, China, R1-1810634, total 5 pages, 3rd Generation Partnership Project, Valbonne, France (Oct. 8-12, 2018).
Vivo, "Evaluation of the RLM for NR-U," 3GPP TSG-RAN WG2 NR AH1807 Meeting, Montreal, Canada, R2-1810758, total 7 pages, 3rd Generation Partnership Project, Valbonne, France (Jul. 2-6, 2018).

* cited by examiner

METHOD FOR RADIO LINK MONITORING ON UNLICENSED SPECTRUM AND COMMUNICATIONS APPARATUS

CROSS-REFERENCE TO RELATED APPLICATION

This application is a continuation of International Application No. PCT/CN2019/113403, filed on Oct. 25, 2019, which claims priority to Chinese Patent Application No. 201811261994.7, filed on Oct. 26, 2018. The disclosures of the aforementioned applications are hereby incorporated by reference in their entireties.

TECHNICAL FIELD

Embodiments of this application relate to the communications field, and more specifically, to a method for radio link monitoring on an unlicensed spectrum and a communications apparatus.

BACKGROUND

On a licensed spectrum, a terminal device that has accessed a network continuously monitors downlink reference signals configured by a network device, to estimate a connection status of a link between the terminal device and the network device, that is, performs radio link monitoring (RLM). For example, when a reference signal received power (RSRP) and/or reference signal received quality (RSRQ) of a downlink reference signal received by the terminal device are/is less than a specified threshold, it is considered that the link between the terminal device and the network device fails (in other words, link quality is poor), and subsequently, the terminal device needs to perform a random access procedure again to reestablish a connection on the network link to the network device.

On an unlicensed spectrum, according to a fair-competition principle, when accessing an unlicensed frequency band to use, the network device or the terminal device needs to perform sensing, for example, perform listen before talk (LBT) or clear channel assessment (CCA). The network device or the terminal device can use (preempt) the frequency band (channel) only when the frequency band is idle and is not occupied by another network device or terminal device, and then can send information and data. After occupying the channel, the network device or the terminal device can send the data on the channel within a specific time period. This time period may be referred to as a channel occupancy time (COT). The network device can send the downlink reference signal only within the COT, and the terminal device performs RLM by using the downlink reference signal detected within the COT. Because a quantity of downlink reference signals detected within the COT is limited, accuracy of RLM performed by using the downlink reference signal detected within the COT is low, and a determining error may occur. It should be noted that the COT may also be referred to as a transmission opportunity (TXOP). The COT is used as an example for description below, but may be replaced with the TXOP. Therefore, on the unlicensed spectrum, how to effectively perform RLM by using the downlink reference signal becomes a problem to be urgently resolved.

SUMMARY

This application provides a method for radio link monitoring on an unlicensed spectrum, to ensure accuracy of radio link monitoring performed on an unlicensed spectrum, improve accuracy of a result of the radio link monitoring, and obtain a more accurate result of the radio link monitoring, thereby improving communication efficiency and communication quality.

According to a first aspect, a method for radio link monitoring on an unlicensed spectrum is provided. The method may be performed by a terminal device or a chip used in a terminal device. The method includes: A terminal device determines one or more channel occupancy times COTs. The terminal device detects one or more downlink reference signals within the one or more COTs. The terminal device determines, based on the downlink reference signal detected within the one or more COTs, whether a channel needs to be reconnected.

According to the method for radio link monitoring on an unlicensed spectrum that is provided in the first aspect, accuracy of radio link monitoring performed on an unlicensed spectrum can be ensured, precision of a result of the radio link monitoring can be improved, and a more accurate result of the radio link monitoring can be obtained, thereby improving communication efficiency and communication quality.

In a possible implementation of the first aspect, the determining, based on the downlink reference signal detected within the one or more COTs, whether a connection needs to be reestablished on a channel includes: when a downlink reference signal whose quality is less than a first detection threshold is detected for the first time, starting a first timer and a second timer, and starting an out-of-synchronization indication OOS counter, where the OOS counter is used to determine a start moment of a third timer, and duration of the second timer is greater than duration of the first timer; by a moment at which the first timer expires, when no downlink reference signal is detected within the one or more COTs, updating a value of the OOS counter, and resetting the first timer, and when a downlink reference signal whose quality is less than the first detection threshold is detected, updating the value of the OOS counter, and resetting the first timer; starting the third timer when the value of the OOS counter becomes a preset threshold; updating, before the third timer expires, a value of an in-synchronization indication IS counter based on the downlink reference signal detected within the one or more COTs; and determining, based on the value of the IS counter, whether the channel needs to be reconnected. In this implementation, a new counter Tc (the first timer) is introduced, and before Tc expires, the value of the OOS counter is updated even if no downlink reference signal is detected. In this way, impact of LBT on N310 (the OOS counter) in the RLM can be reduced, the accuracy of the radio link monitoring performed on the unlicensed spectrum can be improved, and communication reliability can be improved, thereby further improving the communication efficiency.

In a possible implementation of the first aspect, the determining, based on the downlink reference signal detected within the one or more COTs, whether a connection needs to be reestablished on a channel includes: when a downlink reference signal whose quality is less than a first detection threshold is detected for the first time, starting only a second timer, and starting an out-of-synchronization indication OOS counter, where the OOS counter is used to determine a start moment of a third timer; updating a value of the OOS counter based on the downlink reference signal detected within the one or more COTs; starting the third timer when the value of the OOS counter becomes a preset threshold; updating, before the third timer expires, a value of an in-synchronization indication IS counter based on the downlink reference signal detected within the one or more COTs; and determining, based on the value of the IS counter, whether the channel needs to be reconnected.

In a possible implementation of the first aspect, the updating a value of the OOS counter based on the downlink reference signal detected within the one or more COTs includes: by a moment at which the second timer expires, when a downlink reference signal whose quality is less than the first detection threshold is detected within the one or more COTs, updating the value of the OOS counter; and when a downlink reference signal whose quality is greater than or equal to the first detection threshold is detected within the one or more COTs, resetting the second timer, and resetting the OOS counter.

In a possible implementation of the first aspect, the method further includes: after the first timer is started, when a downlink reference signal whose quality is greater than or equal to the first detection threshold is detected within the COT, resetting the first timer and the second timer, and resetting the OOS counter.

In a possible implementation of the first aspect, the updating, before the third timer expires, a value of an in-synchronization indication IS counter based on the downlink reference signal detected within the one or more COTs includes: before the third timer expires, when a downlink reference signal whose quality is greater than or equal to the first detection threshold is detected within the one or more COTs, updating the value of the IS counter; and before the third timer expires, when a downlink reference signal whose quality is less than the first detection threshold is detected within the one or more COTs, resetting the IS counter.

In a possible implementation of the first aspect, the determining, based on the downlink reference signal detected within the one or more COTs, whether a connection needs to be reestablished on a channel includes: starting a second timer when a downlink reference signal whose quality is less than a first detection threshold is detected within the one or more COTs; before the second timer expires, determining a first downlink reference signal that is in the downlink reference signal detected within the one or more COTs and whose quality is less than the first detection threshold; and determining, based on a quantity of first downlink reference signals, whether to start a third timer. In this implementation, whether to start the third timer is determined based on a proportion, in a preset threshold of an OOS counter, of the quantity of downlink reference signals that are detected within duration of the second timer (N310) and whose quality is less than the first detection threshold, so that impact of LBT on N310 can be reduced, and the accuracy of the RLM can be improved, thereby ensuring normal communication between a network device and the terminal device.

In a possible implementation of the first aspect, after the third timer is started, the method further includes: before the third timer expires, determining a second downlink reference signal that is in the downlink reference signal detected within the one or more COTs and whose quality is greater than or equal to the first detection threshold; and determining, based on a quantity of second downlink reference signals, whether the channel needs to be reconnected. In this implementation, whether the channel needs to be reconnected is determined based on a proportion, in N311, of the quantity of downlink reference signals that are detected within duration of the third timer (T310) and whose quality is greater than or equal to the first detection threshold, so that impact of the LBT on N311 can be reduced, and the accuracy of the RLM can be improved, thereby ensuring the normal communication between the network device and the terminal device.

In a possible implementation of the first aspect, the updating the value of the OOS counter includes increasing the value of the OOS counter by 1; and when the downlink reference signal detected within the one or more COTs includes a preconfigured downlink reference signal and a downlink reference signal that is included in a discovery reference signal DRS, the updating a value of the OOS counter based on the downlink reference signal detected within the one or more COTs includes: increasing the value of the OOS counter by 1 when L downlink reference signals that are included in the DRS and whose quality is less than a third detection threshold are continuously detected within the one or more COTs; and increasing the value of the OOS counter by 1 when P first downlink reference signals whose quality is less than the first detection threshold are continuously detected within the one or more COTs, where both P and L are positive integers, and P is greater than or equal to L. In this implementation, the terminal device performs RLM by using the downlink reference signal included in the DRS and the common downlink reference signal, so that the accuracy and precision of the RLM performed by the terminal device can be improved.

In a possible implementation of the first aspect, the method further includes: receiving one or more pieces of COT indication information, where the one or more pieces of COT indication information are used to indicate start and end moments of the one or more COTs, that is, one piece of COT indication information is used to indicate a start moment and an end moment of one COT, and a plurality of pieces of COT indication information are used to indicate start and end moments of a plurality of COTs.

According to a second aspect, a method for radio link monitoring on an unlicensed spectrum is provided. The method may be performed by a terminal device or a chip used in a terminal device. The method includes: detecting downlink reference signals; determining one or more channel occupancy times COTs; and determining, based on the detected downlink reference signals, whether a channel needs to be reconnected, where in the detected downlink reference signals, a first downlink reference signal is located within the COT, a second downlink reference signal is located beyond the COT, and detection thresholds for the first downlink reference signal and the second downlink reference signal are different.

According to the method for radio link monitoring on an unlicensed spectrum that is provided in the second aspect, RLM is performed by using the RSs detected within and beyond the COT, so that accuracy of the RLM can be improved, thereby further ensuring communication between the terminal device and a network device.

In a possible implementation of the second aspect, the determining, based on the detected downlink reference signals, whether a connection needs to be reestablished on a channel includes: when quality of a downlink reference signal detected for the first time is less than the detection threshold, starting a first timer and a second timer, and starting an out-of-synchronization indication OOS counter, where the OOS counter is used to determine a start moment of a third timer, duration of the second timer is greater than duration of the first timer, the detection threshold for the first downlink reference signal is a first detection threshold, the detection threshold for the second downlink reference signal is a second detection threshold, and the first detection threshold is not equal to the second detection threshold;

updating a value of the OOS counter based on the first downlink reference signal and the second downlink reference signal; starting the third timer when the value of the OOS counter becomes a preset threshold; updating a value of an in-synchronization indication IS counter based on the first downlink reference signal and the second downlink reference signal before the third timer expires; and determining, based on the value of the IS counter, whether the channel needs to be reconnected.

In a possible implementation of the second aspect, the updating a value of the OOS counter based on the first downlink reference signal and the second downlink reference signal includes: by a moment at which the first timer expires, when no first downlink reference signal is detected within the COT, updating the value of the OOS counter, and resetting the first timer, and when a first downlink reference signal whose quality is less than the first detection threshold is detected within the COT, updating the value of the OOS counter, and resetting the first timer; or when no second downlink reference signal is detected beyond the COT, updating the value of the OOS counter, and resetting the first timer, and when a second downlink reference signal whose quality is less than the second detection threshold is detected beyond the COT, updating the value of the OOS counter, and resetting the first timer; and when a first downlink reference signal whose quality is greater than or equal to the first detection threshold is detected within the COT, resetting the first timer and the second timer, and resetting the OOS counter, and when a second downlink reference signal whose quality is greater than or equal to the second detection threshold is detected beyond the COT, resetting the first timer and the second timer, and resetting the OOS counter.

In a possible implementation of the second aspect, the determining, based on the detected downlink reference signals, whether a connection needs to be reestablished on a channel includes: when quality of a downlink reference signal detected for the first time is less than the detection threshold, starting only a second timer, and starting an out-of-synchronization indication OOS counter, where the OOS counter is used to determine a start moment of a third timer, the detection threshold for the first downlink reference signal is a first detection threshold, the detection threshold for the second downlink reference signal is a second detection threshold, and the first detection threshold is not equal to the second detection threshold; updating a value of the OOS counter based on the first downlink reference signal and the second downlink reference signal; starting the third timer when the value of the OOS counter becomes a preset threshold; updating a value of an in-synchronization indication IS counter based on the first downlink reference signal and the second downlink reference signal before the third timer expires; and determining, based on the value of the IS counter, whether the channel needs to be reconnected.

In a possible implementation of the second aspect, the updating a value of the OOS counter based on the first downlink reference signal and the second downlink reference signal includes: by a moment at which the second timer expires, when a first downlink reference signal whose quality is less than the first detection threshold is detected within the COT, updating the value of the OOS counter; or when a second downlink reference signal whose quality is less than the second detection threshold is detected beyond the COT, updating the value of the OOS counter; and when a first downlink reference signal whose quality is greater than or equal to the first detection threshold is detected within the COT, resetting the second timer, and resetting the OOS counter, and when a second downlink reference signal whose quality is greater than or equal to the second detection threshold is detected beyond the COT, resetting the second timer, and resetting the OOS counter.

In a possible implementation of the second aspect, the updating the value of the OOS counter includes: increasing the value of the OOS counter by 1 when N first downlink reference signals whose quality is less than the first detection threshold are continuously detected; and increasing the value of the OOS counter by 1 when M second downlink reference signals whose quality is less than the second detection threshold are continuously detected, where both M and N are positive integers, and M is greater than or equal to N.

In a possible implementation of the second aspect, the updating a value of an IS counter based on the first downlink reference signal and the second downlink reference signal before the third timer expires includes: before the third timer expires, when a first downlink reference signal whose quality is less than the first detection threshold is detected, resetting the IS counter, or when a second downlink reference signal whose quality is less than the second detection threshold is detected, resetting the IS counter; increasing the value of the IS counter by 1 when W first downlink reference signals whose quality is greater than or equal to the first detection threshold are continuously detected before the third timer expires; and increasing the value of the IS counter by 1 when Y second downlink reference signals whose quality is greater than or equal to the second detection threshold are continuously detected before the third timer expires, where both W and Y are positive integers, and W is less than or equal to Y.

In a possible implementation of the second aspect, the updating the value of the OOS counter includes increasing the value of the OOS counter by 1; and the downlink reference signal further includes a third downlink reference signal included in a discovery reference signal DRS, and the updating the value of the OOS counter includes: increasing the value of the OOS counter by 1 when L downlink reference signals that are included in the DRS and whose quality is less than a third detection threshold are detected; increasing the value of the OOS counter by 1 when P first downlink reference signals whose quality is less than the first detection threshold are continuously detected; and increasing the value of the OOS counter by 1 when R second downlink reference signals whose quality is less than the second detection threshold are continuously detected, where R, P, and L are all positive integers, P is greater than or equal to L, and R is greater than or equal to P.

In a possible implementation of the second aspect, the method further includes: receiving one or more pieces of COT indication information, where the one or more pieces of COT indication information are used to indicate start and end moments of the one or more COTs, that is, one piece of COT indication information is used to indicate a start moment and an end moment of one COT, and a plurality of pieces of COT indication information are used to indicate start and end moments of a plurality of COTs.

According to a third aspect, a method for radio link monitoring on an unlicensed spectrum is provided. The method may be performed by a network device or a chip used in a network device. The method includes: determining one or more channel occupancy times COTs; sending a downlink reference signal within the one or more COTs; and sending one or more pieces of COT indication information, where the one or more pieces of COT indication information are used to indicate start and end moments of the one or more COTs.

In a possible implementation of the third aspect, the method includes: sending a downlink reference signal beyond the one or more COTs.

In a possible implementation of the third aspect, the COT indication information is used to indicate COT information of the downlink reference signals that have been sent.

In a possible implementation of the third aspect, the downlink reference signal sent within the COT and/or the downlink reference signal sent beyond the COT include/includes a preconfigured downlink reference signal and a downlink reference signal that is included in a discovery reference signal DRS.

According to a fourth aspect, a communications apparatus is provided. The apparatus includes a unit configured to perform the step according to any one of the first aspect, the second aspect, or the possible implementations of the first aspect and the second aspect.

According to a fifth aspect, a communications apparatus is provided. The apparatus includes a unit configured to perform the step according to any one of the third aspect or the possible implementations of the third aspect.

According to a sixth aspect, a communications apparatus is provided. The apparatus includes at least one processor and a memory, and the at least one processor is configured to perform the method according to any one of the first aspect, the second aspect, or the possible implementations of the first aspect and the second aspect.

According to a seventh aspect, a communications apparatus is provided. The apparatus includes at least one processor and a memory, and the at least one processor is configured to perform the method according to any one of the third aspect or the possible implementations of the third aspect.

According to an eighth aspect, a terminal device is provided. The terminal device includes the communications apparatus according to the fourth aspect or the communications apparatus according to the sixth aspect.

According to a ninth aspect, a network device is provided. The network device includes the communications apparatus according to the fifth aspect or the communications apparatus according to the seventh aspect.

According to a tenth aspect, a computer program product is provided. The computer program product includes a computer program. When being executed by a processor, the computer program is configured to perform the method according to any one of the first aspect to the third aspect or the possible implementations of the first aspect to the third aspect, or perform the method according to any one of the second aspect or the possible implementations of the second aspect.

According to an eleventh aspect, a computer-readable storage medium is provided. The computer-readable storage medium stores a computer program. When being executed, the computer program is configured to perform the method according to any one of the first aspect to the third aspect or the possible implementations of the first aspect to the third aspect.

According to a twelfth aspect, a chip system is provided. The chip system includes a processor, configured to implement the functions in each of the foregoing aspects, for example, generate, receive, send, or process data and/or information in the foregoing methods. In a possible design, the chip system further includes a memory. The memory is configured to store necessary program instructions and necessary data. The chip system may include a chip, or may include a chip and another discrete component. The processor and the memory may be decoupled, separately disposed on different devices, and connected in a wired or wireless manner; or the processor and the memory may be coupled on a same device.

DESCRIPTION OF EMBODIMENTS

The following describes the technical solutions in this application with reference to the accompanying drawings.

The technical solutions in the embodiments of this application may be applied to various communications systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a future 5th generation (5G) system or a new radio (NR) system.

Figure 1:
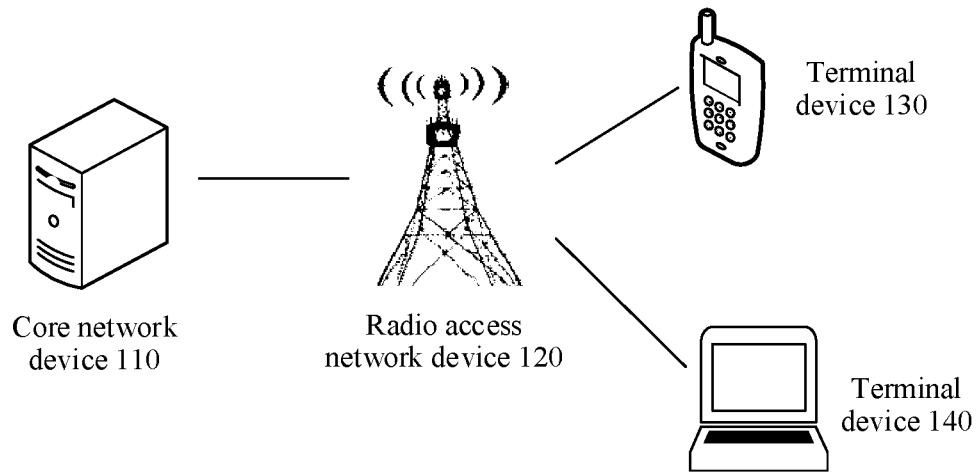
FIG. 1 is a schematic architectural diagram of a mobile communications system to which embodiments of this application are applicable.

FIG. 1 is a schematic architectural diagram of a mobile communications system 100 to which embodiments of this application are applicable. As shown in FIG. 1, the mobile communications system 100 may include a core network device 110, a radio access network device 120, and at least one terminal device (for example, a terminal device 130 and a terminal device 140 shown in FIG. 1). The terminal device is connected to the radio access network device in a wireless manner, and the radio access network device is connected to the core network device in a wireless or wired manner. The core network device and the radio access network device may be different physical devices independent of each other, or functions of the core network device and logical functions of the radio access network device may be integrated into a same physical device, or some functions of the core network device and some functions of the radio access network device may be integrated into one physical device. The terminal device may be at a fixed location or may be movable. FIG. 1 is merely a schematic diagram, and the communications system may further include another network device, for example, may further include a wireless relay device and a wireless backhaul device that are not shown in FIG. 1. Quantities of core network devices, radio access network devices, and terminal devices included in the mobile communications system are not limited in the embodiments of this application.

In the mobile communications system 100, the core network device 110, the radio access network device 120, and the at least one terminal device may work in an unlicensed frequency band, that is, perform communication on a communication resource in the unlicensed frequency band. For example, the terminal device may receive, in the unlicensed frequency band, a downlink reference signal sent by a network device and perform RLM.

The terminal device in the mobile communications system 100 may also be referred to as a terminal, user equipment (UE), a mobile station (MS), a mobile terminal (MT), and the like. The terminal device may be a mobile phone, a tablet computer (Pad), a computer with a wireless transceiver function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like. In this application, the foregoing terminal device and a chip that can be used in the foregoing terminal device are collectively referred to as a terminal device. It should be understood that a specific technology and a specific device form that are used by the terminal device are not limited in the embodiments of this application.

In the mobile communications system 100, the radio access network device 120 is an access device through which the terminal device accesses the mobile communications system in a wireless manner. The radio access network device 120 may be a base station, an evolved NodeB (eNodeB), a home base station, an access point (AP) in a Wi-Fi system, a wireless relay node, a wireless backhaul node, a transmission point (TP), a transmission reception point (TRP), or the like; or may be a gNB in an NR system; or may be a component or a part of devices that constitutes/constitute a base station, for example, may be a centralized unit (CU), a distributed unit (DU), or a baseband unit (BBU). It should be understood that a specific technology and a specific device form that are used by the radio access network device are not limited in the embodiments of this application. In this application, the radio access network device is referred to as a network device for short. Unless otherwise specified, in this application, all network devices are radio access network devices. In this application, the network device may be a network device itself, or may be a chip used in a network device to complete a wireless communication processing function.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory. The operating system may be any one or more computer operating systems that implement service processing by using a process, for example, a Linux operating system, a UNIX operating system, an Android operating system, an iOS operating system, or a Windows operating system. The application layer includes applications such as a browser, an address book, word processing software, and instant communications software. In addition, a specific structure of an execution body of a method provided in the embodiments of this application is not specifically limited in the embodiments of this application, provided that a program that records code for the method provided in the embodiments of this application can be run to perform communication according to the method provided in the embodiments of this application. For example, the execution body of the method provided in the embodiments of this application may be a terminal device, a network device, or a function module that can invoke and execute the program in a terminal device or a network device.

First, main terms used in the embodiments of this application are briefly described.

Licensed spectrum: Due to limited resources for radio electromagnetic waves, the radio electromagnetic waves are divided and used according to strict international regulations. The licensed spectrum is a part of spectrums for the radio electromagnetic waves in frequency domain. The licensed spectrum is strictly restricted and protected. Only an authorized user and a device that is of the user and that complies with specifications are allowed to access the licensed spectrum, and the user needs to pay for the access. Currently, important departments such as public security, railway, civil aviation, broadcast and television, and telecommunications all have specific licensed spectrums. Communication between devices in these departments is performed on the licensed spectrums of the departments. Especially in the telecommunications industry, mobile phones we use every day perform communication on licensed spectrums owned by operators. Three major operators all have dedicated frequency bands licensed by the National Radio Administration Bureau, to protect mobile communication of the public from interference.

Unlicensed spectrum: The unlicensed spectrum is a spectrum that can be accessed and used by all devices that meet a specific specification and standard. However, interference to other users needs to be avoided. Typically, for both wireless fidelity (WIFI) and Bluetooth that are commonly used, transmission is performed on the unlicensed spectrum. The International Telecommunication Union-Radio communication Sector has defined an industrial, scientific and medical (ISM) frequency band. The ISM frequency band is mainly allowed to be used by industrial, scientific, and medical institutions, and does not need to be licensed. Definitely, the ISM frequency band needs to comply with a specific transmit power, and does not interfere with other frequency bands.

On the licensed spectrum, a terminal device that has accessed a network continuously monitors downlink reference signals configured by a network device, to estimate a connection status of a link between the terminal device and a base station, that is, performs RLM. The downlink reference signals may include one or more of a channel state information reference signal (CSI-RS), a cell-specific reference signal (CRS), a positioning reference signal (PRS), and a demodulation reference signal (DMRS). Definitely, the terminal device may alternatively perform the foregoing RLM by using a synchronization signal block (SSB) sent by the network device.

The SSB may also be referred to as a synchronization signal/physical broadcast channel block (SS/PBCH block). For example, when an RSRP and/or RSRQ of the CSI-RS received by the terminal device are/is less than a specified threshold, it is considered that the link between the terminal device and the network device fails (in other words, link quality is poor), and subsequently, the terminal device needs to perform a random access procedure again to reestablish a connection on the network link to the network device.

Figure 2:
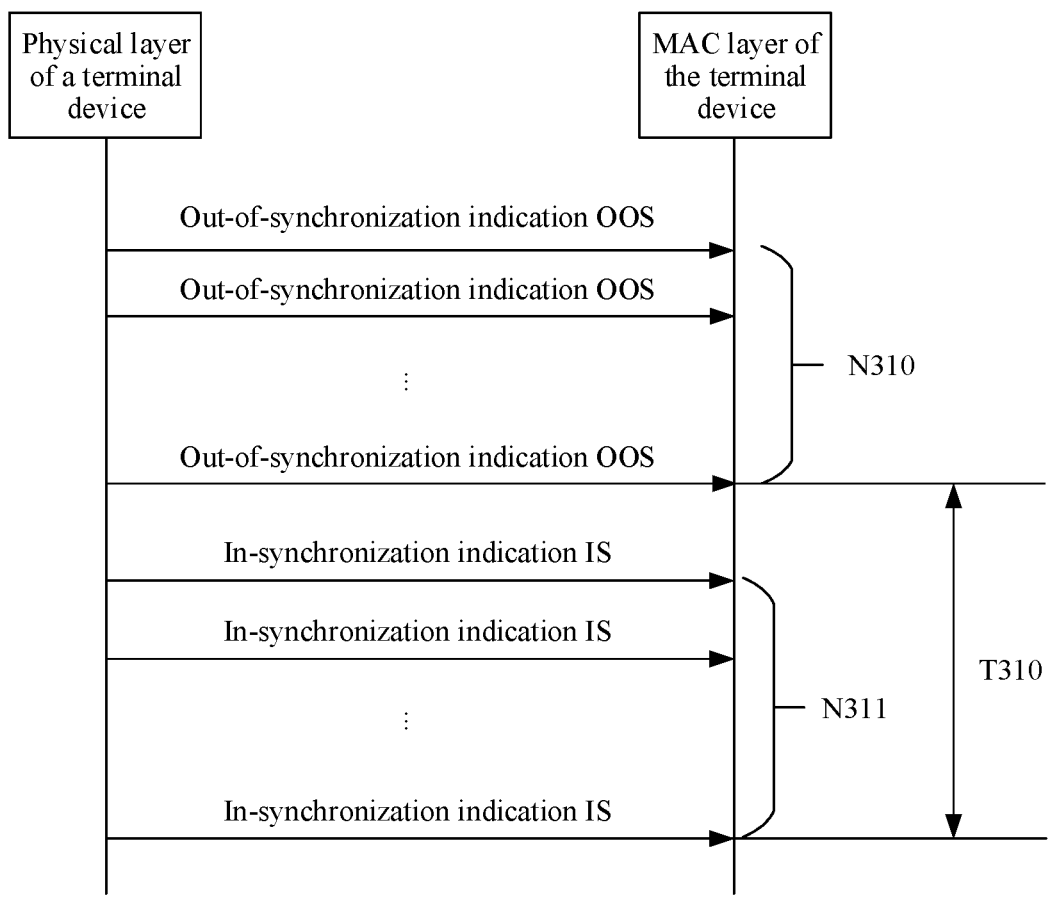
FIG. 2 is a schematic flowchart of performing RLM in a conventional technology.

Specifically, FIG. 2 is a schematic diagram of performing, by a terminal device, radio link monitoring on a licensed spectrum in LTE. As shown in FIG. 2, when RSRPs/RSRQ of N310 downlink reference signals (for example, CSI-RSs) that are continuously detected by a physical layer of the terminal device are/is less than a threshold, a timer T310 is started. If RSRPs/RSRQ of N311 consecutive downlink reference signals are/is greater than or equal to the threshold before the timer T310 expires (before the timer T310 becomes invalid), it is considered that a radio link between the terminal device and a network device has been recovered. Otherwise, it is considered that a radio link between the terminal device and a network device has failed, and after the timer T310 expires, the terminal device reestablishes a connection to the network device on the radio link. The physical layer of the terminal device further notifies, to a higher layer (a media access control (MAC) layer) of the terminal device, whether an RSRP/RSRQ of a detected downlink reference signal meets the threshold. When the RSRP/RSRQ of the downlink reference signal is less than the threshold, the physical layer sends an out-of-synchronization (out-of-sync indication, OOS) indication to the higher layer. When the RSRP/RSRQ of the downlink reference signal is greater than or equal to the threshold, the physical layer sends an in-synchronization indication (in sync indication, IS) to the higher layer. Because the configured downlink reference signals are periodically sent (for example, one downlink reference signal is sent every millisecond (ms)), N310 and N311 may also be understood as time periods, in other words, may also be considered as timers. To be specific, when RSRPs/RSRQ of all downlink reference signals detected by the physical layer of the terminal device within the time period N310 are/is less than the threshold, in other words, when a quantity of continuously sent OOSs reaches a specific threshold, the timer T310 is started. The OOS may be considered as a counter, and when a value of the OOS reaches the threshold, the timer T310 is started. Before the timer T310 expires (becomes invalid), if RSRPs/RSRQ of downlink reference signals continuously detected by the physical layer of the terminal device within the time period N311 are/is greater than the threshold, it is considered that the radio link between the terminal device and the network device has been recovered, where a quantity of the downlink reference signals reaches a quantity threshold. To be specific, when a quantity of ISs sent by the physical layer of the terminal device to the higher layer in duration of T310 reaches a specific threshold, it is considered that the radio link between the terminal device and the network device has been recovered. A start moment of N310 is a moment at which the Pt downlink reference signal whose RSRP/RSRQ is less than the threshold is detected. A start moment of N311 is a moment at which the Pt downlink reference signal whose RSRP/RSRQ is greater than or equal to the threshold is detected. A value of N310 may be 200 ms, a value of N311 may be 100 ms, and the order of magnitude of T310 is second.

An RLM mechanism and a basic working procedure in NR are similar to those in LTE. A difference is that two different detection threshold groups can be set for different service types in NR.

On an unlicensed spectrum, according to a fair-competition principle, when accessing an unlicensed frequency band to use, a network device or a terminal device needs to perform sensing, for example, perform listen before talk (LBT) or clear channel assessment (CCA), for channel contention. The network device or the terminal device can use (preempt) the frequency band (channel) only when the frequency band is idle and is not occupied by another network device or terminal device, and then can send information and data.

Specifically, for type A LBT, a device that is to perform type A LBT first determines a backoff priority based on importance of to-be-sent data and a size of the data before the LBT, and randomly selects a backoff quantity based on the priority. The backoff quantity is a quantity of slots in which the device needs to sense that a channel is idle. For example, the device can send the data only when continuously sensing that the channel is idle in the backoff quantity of slots. The device may perform independent backoff on a plurality of component carriers (CC), and after completing backoff on a component carrier, the device waits for another component carrier on which backoff is still being performed. After backoff is completed on all the component carriers on which LBT is to be performed, the device needs to perform additional one-shot CCA backoff to determine whether all the component carriers are idle. The one-shot CCA backoff means that at an end moment of the last backoff slot, detection is performed again on a set of all the component carriers on which the backoff has been completed and that are no longer required to be sensed. If all the component carriers are idle, the device simultaneously performs transmission on all the idle component carriers.

For type B LBT, a device that is to perform type B LBT performs backoff only on a randomly selected component carrier, and performs one-shot CCA backoff on another component carrier when the backoff ends. If the component carrier is idle, data transmission is performed. If the component carrier is not idle, data transmission cannot be performed on the component carrier at this time.

The terminal device or the network device may obtain, in a contention manner of performing LBT, permission to use the channel, in other words, the network device or the terminal device may send data on the channel within a COT. On the unlicensed spectrum, it cannot be ensured that a periodic downlink reference signal configured for the terminal device is sent on a preset time-frequency resource. For example, the downlink reference signal may be sent on a preconfigured time-frequency resource within the COT. However, it is difficult to ensure that the downlink reference signal is sent on the preconfigured time-frequency resource beyond the COT. The network device sends information about the COT (a start position, an end position, and the like of the COT) to the terminal device by using control signaling. The control signaling may be a downlink identification signal (DL identification signal), request to send/clear to send (request to send, RTS/clear to send, CTS), group-common physical downlink control channel (group-common PDCCH) information, or the like.

The terminal device performs RLM by using a downlink reference signal detected within the COT. For example, the downlink reference signal detected within the COT is compared with the foregoing thresholds (N311, T310, and N310) by using a process similar to that shown in FIG. 2, to monitor the radio link between the terminal device and the network device. Because a quantity of downlink reference signals detected within the COT is limited, accuracy of monitoring the radio link between the terminal device and the network device is low when the terminal device compares the downlink reference signal detected within the COT with the foregoing thresholds N311, T310, and N310, and a determining error may occur. Therefore, on the unlicensed spectrum, due to a restriction of the COT, how to effectively and reliably perform RLM by using the downlink reference signal becomes a problem to be urgently resolved.

Based on the foregoing problem, this application provides a method for radio link monitoring, to ensure accuracy of radio link monitoring performed on an unlicensed spectrum, improve precision of a result of the radio link monitoring, and obtain a more accurate result of the radio link monitoring, thereby improving communication efficiency and communication quality.

It should be noted that the COT may also be referred to as a transmission opportunity (TXOP). The COT is used as an example for description in the embodiments of this application, but may be replaced with the TXOP.

Figure 3:
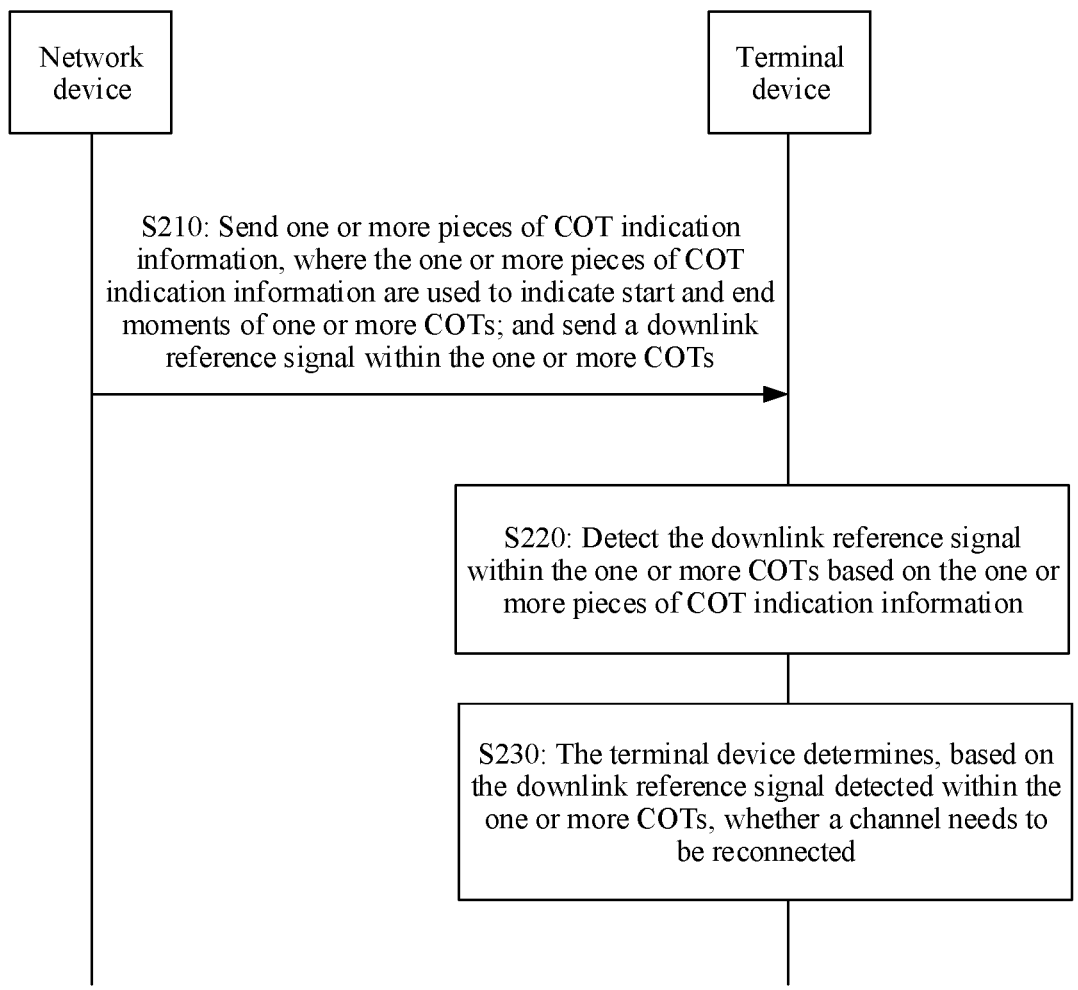
FIG. 3 is a schematic interaction diagram of a method for radio link monitoring on an unlicensed spectrum according to an embodiment of this application.

With reference to FIG. 3, the following describes in detail a method for radio link monitoring on an unlicensed spectrum that is provided in this application. FIG. 3 is a schematic interaction diagram of a method 200 for radio link monitoring according to an embodiment of this application. The method 200 may be applied to the scenario shown in FIG. 1, and definitely may also be applied to another communication scenario. This is not limited in this embodiment of this application.

It should be understood that, in this embodiment of this application, the method is described by using an example in which a terminal device and a network device perform the method for radio link monitoring on an unlicensed spectrum. By way of example rather than limitation, the method may alternatively be performed by a chip used in a terminal device and a chip used in a base station.

The following specifically describes the method for radio link monitoring on an unlicensed spectrum that is provided in this application.

As shown in FIG. 3, the method 200 shown in FIG. 3 may include step 210 to step 230. The following describes the steps in the method 200 in detail with reference to FIG. 3.

S210: The terminal device receives one or more pieces of COT indication information sent by the network device, where the one or more pieces of COT indication information are used to indicate start and end moments of one or more COTs. The network device sends one or more downlink reference signals to the terminal device within the one or more COTs.

S220: The terminal device detects the downlink reference signal within the one or more COTs based on the COT indication information.

S230: The terminal device determines, based on the downlink reference signal detected within the one or more COTs, whether a channel needs to be reconnected.

Figure 4:
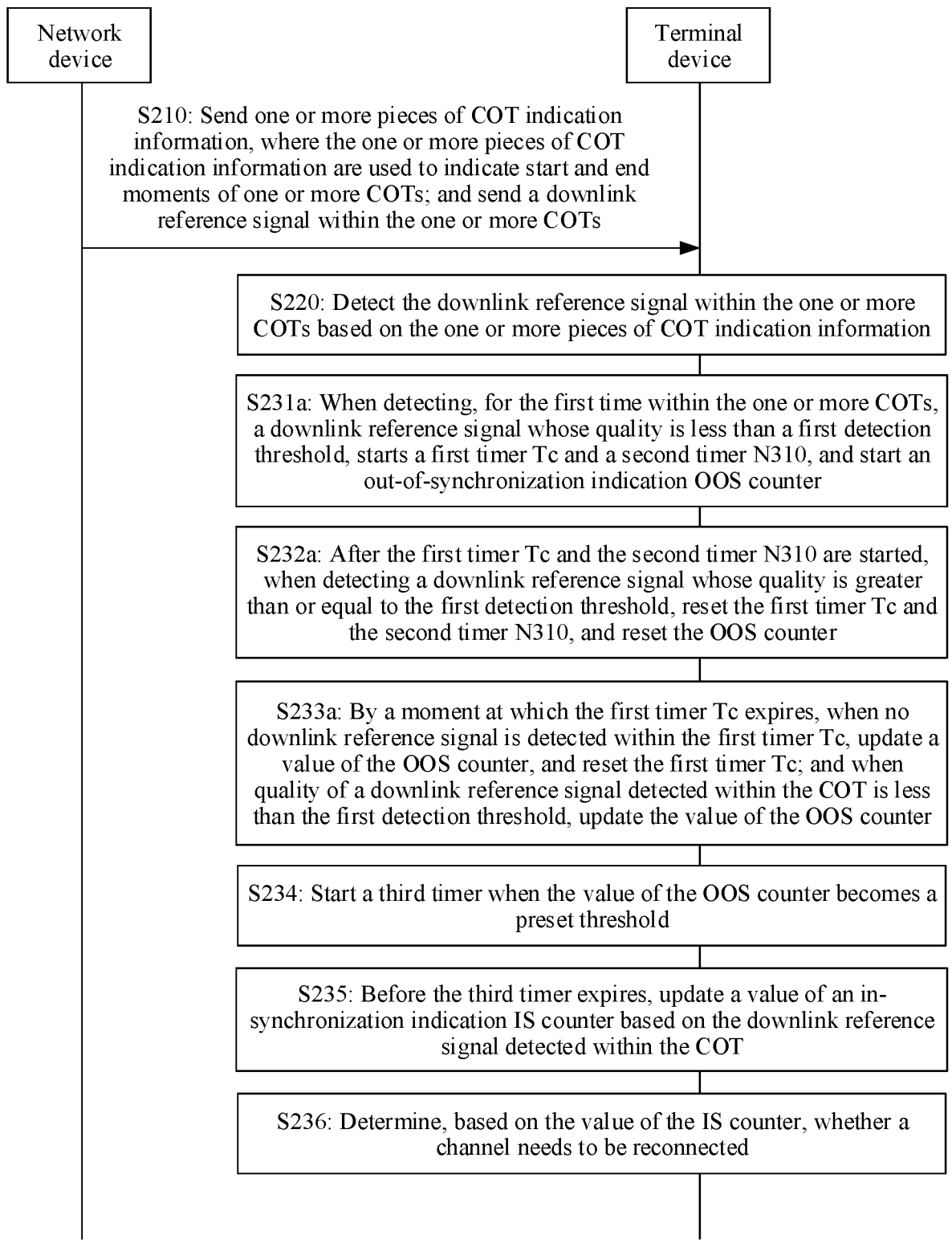
FIG. 4 is a schematic interaction diagram of another method for radio link monitoring on an unlicensed spectrum according to an embodiment of this application.

Specifically, in an embodiment, as shown in FIG. 4, step S230 may include the following substeps.

S231a: When detecting, for the first time within the one or more COTs, a downlink reference signal whose quality is less than a first detection threshold, the terminal device starts a first timer Tc and a second timer N310, and starts an out-of-synchronization indication OOS counter, where the OOS counter is used to determine a start moment of a third timer, and duration of the first timer Tc is less than duration of the second timer.

S232a: After the first timer Tc and the second timer N310 are started, when detecting a downlink reference signal whose quality is greater than or equal to the first detection threshold, the terminal device resets the first timer Tc and the second timer N310, and resets the OOS counter.

S233a: By a moment at which the first timer Tc expires, when no downlink reference signal is detected within the duration of the first timer Tc, update a value of the OOS counter (for example, increase the value of the OOS counter by 1), and reset the first timer Tc (in this case, the second timer N310 is not reset); and when quality of a downlink reference signal detected within the COT is less than the first detection threshold, update the value of the OOS counter (for example, increase the value of the OOS counter by 1), and reset the first timer Tc (in this case, the second timer N310 is not reset), where the OOS counter is used to determine the start moment of the third timer.

S234: Start the third timer when the value of the OOS counter becomes a preset threshold.

S235: Before the third timer expires, update a value of an in-synchronization indication IS counter based on the downlink reference signal detected within the COT.

S236: Determine, based on the value of the IS counter, whether the channel needs to be reconnected.

Specifically, in S210, after obtaining, through LBT on an unlicensed spectrum, permission to use the channel, the network device sends the COT indication information to the terminal device, to notify the terminal device of information such as a start moment and an end moment of using the channel. The COT indication information may be sent to the terminal device by using a downlink identification signal, RTS, CTS, a group-common PDCCH, or the like. It should be understood that the duration of the second timer N310 may include a plurality of inconsecutive COTs, in other words, the duration of the second timer is greater than duration of one COT. Therefore, the COT indication information obtained by the terminal device in step S210 may be one or more pieces of COT indication information. Each piece of COT indication information is used to indicate a start moment and an end moment of one COT, and a plurality of pieces of COT indication information are used to indicate start and end moments of a plurality of COTs. The terminal device detects the downlink reference signal only within the one or more COT periods indicated by the one or more pieces of COT indication information.

In S220, after receiving the one or more pieces of COT indication information, the terminal device may detect the downlink reference signal within the one or more COT periods based on the start and end moments that are of the one or more COTs and that are indicated by the one or more pieces of COT indication information.

In S231a, the terminal device detects the downlink reference signal within the one or more COTs. It should be understood that the network device pre-notifies the terminal device of configured information such as a sending position and a periodicity of the downlink reference signal, and the terminal device detects the downlink reference signal in the position of each downlink reference signal within the COT period. When the 1st downlink reference signal whose quality is less than the first detection threshold is detected, the first timer and the second timer are started, and the out-of-synchronization indication OOS counter is started. The OOS counter is used to determine the start moment of the third timer, and the third timer may be a timer T310. For ease of description, the first timer is represented by Tc. The second timer may be the timer (counter) N310, and may indicate that a specific quantity of downlink reference signals whose quality is less than the first detection threshold need to be detected within the time period N310. For example, if the duration of the timer N310 is 100 ms, and the preconfigured periodicity of the downlink reference signal is 5 ms, 20 (the threshold of the OOS counter) downlink reference signals whose quality is less than the first detection threshold need to be continuously detected within the time period N310. Specifically, the first start moment of the first timer Tc is the same as a start moment of N310, a time duration of Tc is less than the duration of N310, and in a time range of N310, the first timer Tc is reset each time the value of OOS counter is updated. The time duration of Tc may be configurable, and is specified in a standard or configured by a gNodeB.

Optionally, the duration of the first timer Tc may be a ratio of the duration of the timer N310 to a configured quantity of downlink reference signals that need to be detected. For example, if the duration of the timer N310 is 100 ms, and the configured quantity of downlink reference signals that need to be detected within 100 ms is 10, the duration of Tc is 10 ms. The configured quantity, namely, 10, of downlink reference signals that need to be detected within 100 ms may be understood as a minimum quantity of downlink reference signals required for determining channel quality within the duration of N310. The first detection threshold may be for an RSRP, RSRQ, and/or the like of the downlink reference signal.

Due to impact of LBT on sending of the downlink reference signal on the unlicensed spectrum, the terminal device may fail to detect all preconfigured downlink reference signals within the duration of N310. For example, if the duration of N310 is 100 ms and the preconfigured periodicity of the downlink reference signal is 5 ms, 20 downlink reference signals can be received within the duration of N310 based on the preconfigured periodicity of the downlink reference signal. However, due to the impact of the LBT, a quantity of downlink reference signals actually received by the terminal device may be less than 20. Therefore, during RLM, the minimum quantity of reference signals that can be used to estimate the channel quality needs to be determined. For example, if the minimum quantity of required reference signals is 10, the duration of the first timer Tc, namely, 10 ms, may be obtained by dividing the duration of N310, namely, 100 ms, by the minimum quantity of required reference signals. After the downlink reference signal whose quality is less than the first detection threshold is detected, the first timer Tc and the second timer N310 are started, and the out-of-synchronization indication OOS counter is started.

In S231a, after Tc and N310 are started, because the OOS counter is started, the value of the OOS counter is updated. Step S232a and step S233a may be considered as a specific process of updating the value of OOS counter.

Specifically, in S232a, after the first timer Tc and the second timer N310 are started, if the terminal device detects the downlink reference signal whose quality is greater than or equal to the first detection threshold, it indicates that quality of a radio link between the terminal device and the network device is relatively good, and the first timer Tc and the second timer N310 are reset, that is, the first timer Tc and the second timer N310 are set to 0, the value of the OOS counter is set to 0, and it is determined that the channel (the radio link) between the terminal device and the network device does not need to be reconnected.

It should be understood that after the first timer Tc and the second timer N310 are started, regardless of whether Tc or N310 expires, the first timer Tc, the second timer N310, and the OOS counter are reset as long as a downlink reference signal whose quality is greater than or equal to the first detection threshold is detected.

After the first timer Tc and the second timer N310 are reset, if a downlink reference signal whose quality is less than the first detection threshold is detected, the first timer Tc and the second timer N310 are restarted, and the OOS counter is started.

In S233a, by the moment at which the first timer expires, if no downlink reference signal is detected, the value of the OOS counter is updated (for example, the value of the OOS counter may be increased by 1). The OOS counter is used to determine the start moment of the third timer, and the third timer may be the timer T310. A maximum value of the OOS counter may be understood as a configured quantity of downlink reference signals to be detected within the time period N310. For example, if the duration of N310 is 100 ms and the preconfigured periodicity of the downlink reference signal is 5 ms, the maximum value (the threshold) of the OOS counter is 20. That is, when the value of the OOS counter reaches 20, the third timer is started.

By the moment at which the first timer expires, if the downlink reference signal whose quality is greater than or equal to the first detection threshold is detected, the first timer Tc and the second timer N310 are reset. If the second timer N310 is reset, it means that the OOS counter is also reset (set to 0). In other words, the OOS counter is reset each time the second timer N310 is reset. The OOS counter is restarted each time the second timer N310 is restarted. It should be understood that, "before the first timer expires" herein may be "before the first timer that is started for the first time expires", or may be "before the first timer that is started after being reset expires". If no downlink reference signal is detected before the first timer expires, the value of the OOS counter is updated, that is, it is considered that the network device sends, within the duration of Tc, a downlink reference signal whose quality is less than the first detection threshold. The first timer Tc is used in the method, and the value of OOS counter is updated even if no downlink reference signal is detected within the duration of Tc, so that impact of an LBT process on the OOS counter can be reduced (that is, impact of the LBT on N310 can be reduced), thereby improving accuracy of the RLM.

By the moment at which the first timer expires, if the downlink reference signal whose quality is less than the first detection threshold is detected, the value of the OOS counter is updated (for example, the value of the OOS counter may be increased by 1), and the first timer Tc is reset. After the first timer Tc is reset, if a next downlink reference signal whose quality is less than the first detection threshold is detected, the value of the OOS counter continues to be updated (for example, the value of the OOS counter may continue to be increased by 1), and the first timer Tc is restarted.

According to the foregoing descriptions, if the downlink reference signal whose quality is less than the first detection threshold is detected, the value of the OOS counter is updated and the first timer Tc is reset; if no downlink reference signal is detected before Tc expires, the value of the OOS counter also needs to be updated, and the first timer Tc also needs to be reset.

Before N310 expires, if a downlink reference signal whose quality is greater than or equal to the first detection threshold is subsequently detected after the first timer Tc is restarted, the first timer Tc and the second timer N310 are reset, the OOS counter is also reset, and it is considered that the quality of the radio link is relatively good.

Before N310 expires, if a downlink reference signal whose quality is less than the first detection threshold is subsequently detected after the first timer Tc is restarted, the first timer Tc is reset, and the value of the OOS counter is updated. A procedure performed after the first timer Tc is restarted is similar to the foregoing procedure performed after the first timer Tc is started for the first time.

The following provides an example to describe the process of updating the value of the OOS counter.

Assuming that the periodicity of the downlink reference signal is 5 ms, and quality of a downlink reference signal detected by the terminal device at the 5 ms is less than the first detection threshold, the first timer Tc and the second timer N310 are started, and the OOS counter is started. It is assumed that the duration of Tc is 10 ms, the duration of the second timer is 100 ms, and the configured threshold of the OOS counter is 20. If no downlink reference signal is detected at the 10 ms, the value of the OOS counter is updated to 1, and the first timer Tc is reset. If quality of a downlink reference signal detected at the 15 ms is less than the first detection threshold, the value of the OOS counter is updated to 2, and the first timer Tc is reset. If quality of a downlink reference signal detected at the 20 ms is less than the first detection threshold, the value of the OOS counter is updated to 3, and the first timer Tc is reset. If quality of a downlink reference signal detected at the 25 ms is greater than the first detection threshold, the first timer Tc and the second timer N310 are reset, and the OOS counter is reset (set to 0). The value of the OOS counter is continuously updated by using this method.

In S234, the value of the OOS counter is continuously updated by using the foregoing method, and the third timer T310 is started when the value of the OOS counter becomes the preset threshold. The preset threshold of the OOS counter may be the foregoing configured quantity of downlink reference signals within the time period N310. After the third timer T310 is started, in S235, before the third timer expires, in other words, within duration of the third timer, the value of the in-synchronization indication IS counter is updated based on the downlink reference signal detected within the COT.

Specifically, in step S235, within the duration of the third timer T310, the terminal device starts the IS counter when detecting a downlink reference signal whose quality is greater than or equal to the first detection threshold. The value of the IS counter is updated (for example, is increased by 1) each time a downlink reference signal whose quality is greater than or equal to the first detection threshold is detected. If a downlink reference signal whose quality is less than the first detection threshold is detected, the IS counter is reset (the value of the IS counter is set to 0). After the IS counter is reset, if a downlink reference signal whose quality is greater than or equal to the first detection threshold is subsequently detected, the IS counter is restarted (for example, the value of the IS counter changes to 1 again). If a quantity of downlink reference signals whose quality is greater than or equal to the first detection threshold and that are continuously detected within the duration of the third timer becomes a preset threshold of the IS counter, that is, the value of the IS counter reaches the preset threshold within the duration of the third timer, in step S236, it is determined that the channel does not need to be reconnected. Before the third timer expires, if the value of the IS counter does not reach the preset threshold, it is determined that the channel quality is relatively poor and the channel needs to be reconnected. The threshold of the IS counter may be a value of N311 within the duration of the timer T310.

According to the method for radio link monitoring on an unlicensed spectrum that is provided in this application, the new counter Tc (the first timer) is introduced, and before Tc expires, the value of the OOS counter is updated even if no downlink reference signal is detected. In this way, the impact of the LBT on N310 (the OOS counter) in the RLM can be reduced, the accuracy of the radio link monitoring performed on the unlicensed spectrum can be improved, and communication reliability can be improved, thereby further improving communication efficiency.

Figure 5:
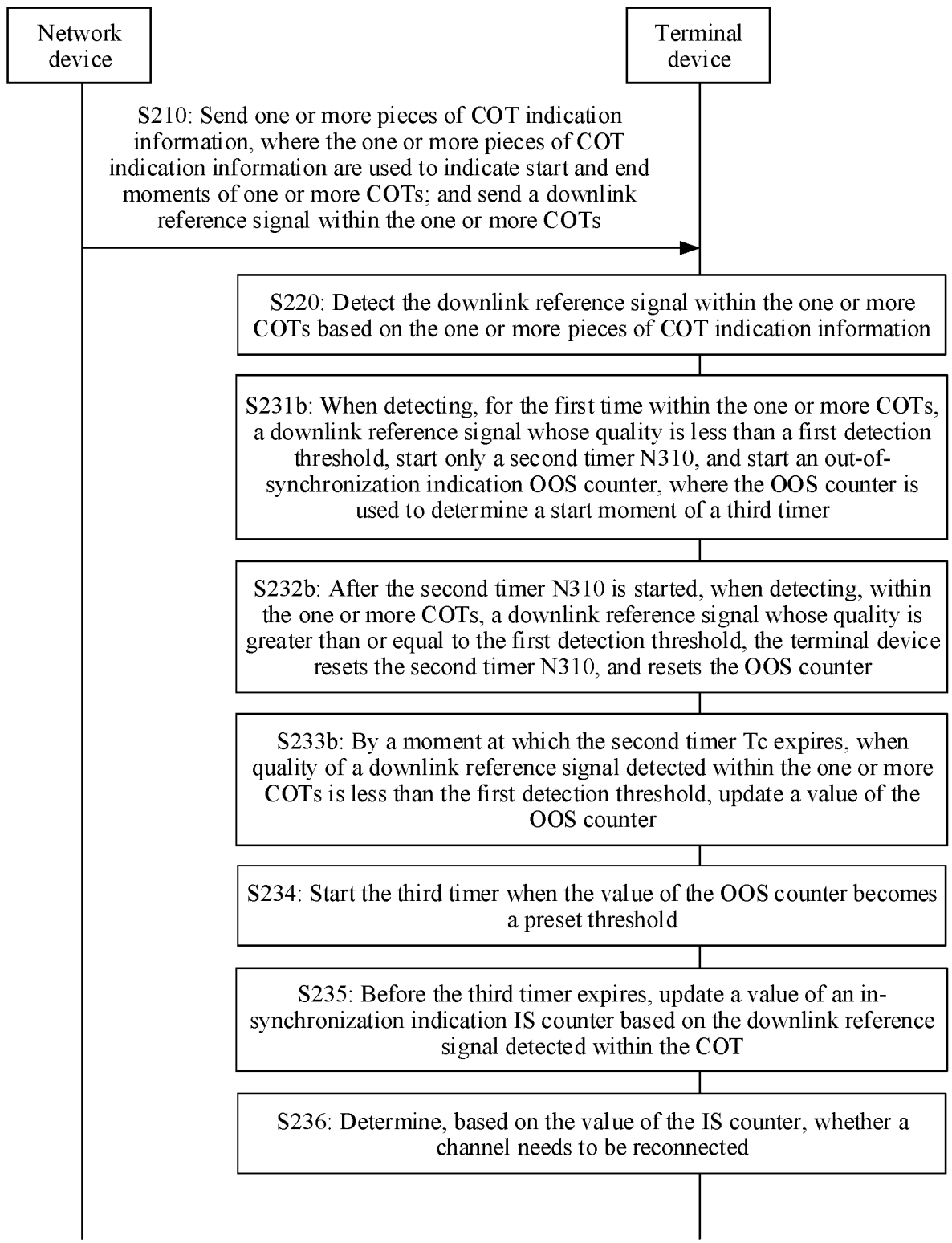
FIG. 5 is a schematic interaction diagram of still another method for radio link monitoring on an unlicensed spectrum according to an embodiment of this application.

Specifically, in another embodiment, as shown in FIG. 5, in the method 200, step S230 may include the following substeps.

S231b: When detecting, for the first time within the one or more COTs, a downlink reference signal whose quality is less than a first detection threshold, the terminal device starts only a second timer N310, and starts an out-of-synchronization indication OOS counter, where the OOS counter is used to determine a start moment of a third timer.

S232b: After the second timer N310 is started, when detecting, within the one or more COTs, a downlink reference signal whose quality is greater than or equal to the first detection threshold, the terminal device resets the second timer N310, and resets the OOS counter.

S233b: By a moment at which the second timer N310 expires, when quality of a downlink reference signal detected within the one or more COTs is less than the first detection threshold, update a value of the OOS counter (for example, increase the value of the OOS counter by 1), where the OOS counter is used to determine the start moment of the third timer.

S234: Start the third timer when the value of the OOS counter becomes a preset threshold.

S235: Before the third timer expires, update a value of an in-synchronization indication IS counter based on the downlink reference signal detected within the COT.

S236: Determine, based on the value of the IS counter, whether the channel needs to be reconnected.

It should be understood that, for related descriptions of the foregoing steps, refer to the related descriptions in the embodiment shown in FIG. 4. A difference from the embodiment shown in FIG. 4 lies in that, in S232b, only the second timer is started, and the first timer is not started, that is, the first timer may not exist.

Figure 6:
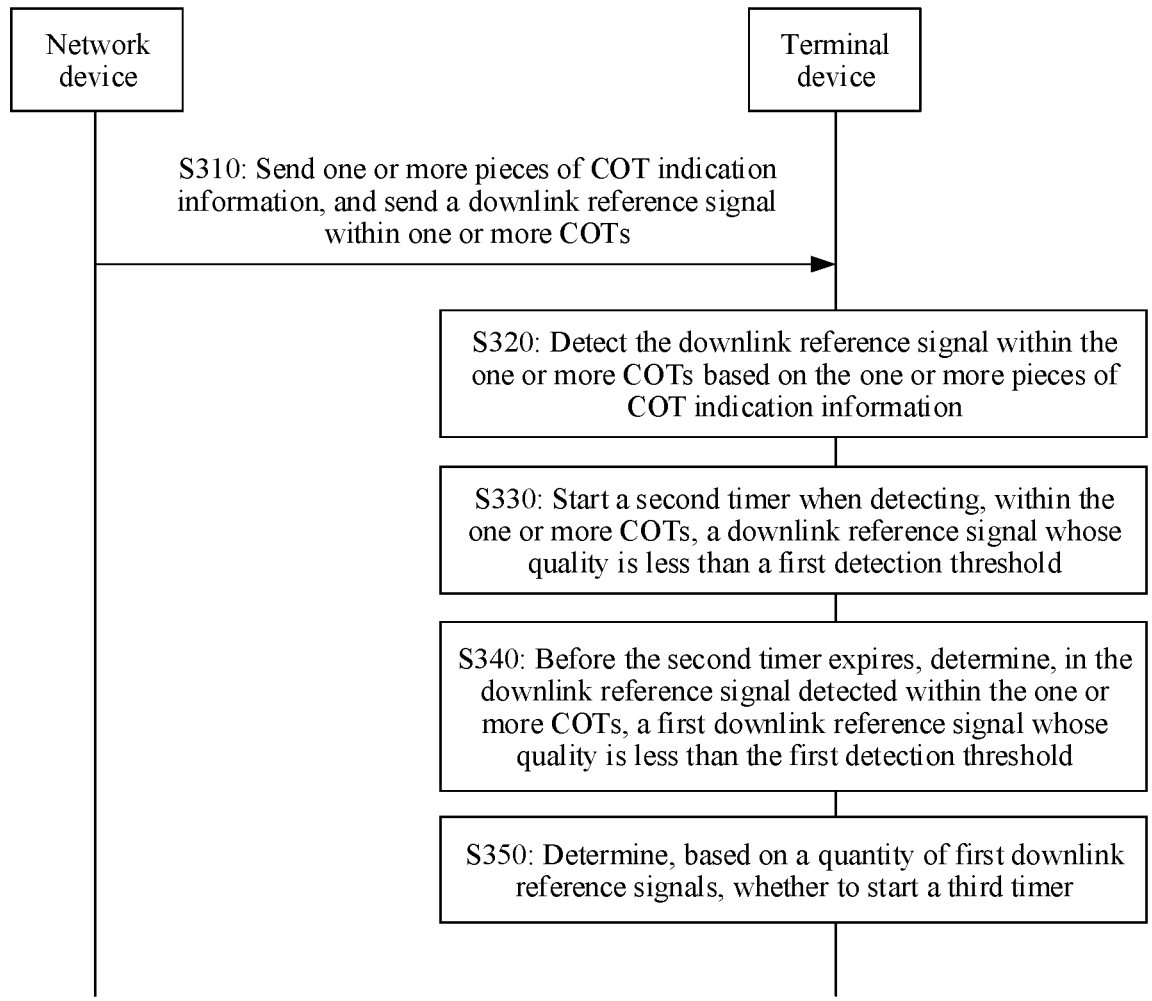
FIG. 6 is a schematic interaction diagram of still another method for radio link monitoring on an unlicensed spectrum according to an embodiment of this application.

FIG. 6 is a schematic flowchart of a method 300 for radio link monitoring on an unlicensed spectrum according to another embodiment of this application. The method 300 shown in FIG. 6 may include step 310 to step 350. The following describes the steps in the method 300 in detail with reference to FIG. 6.

As shown in FIG. 6, the method 300 includes the following steps.

S310: A terminal device receives one or more pieces of COT indication information sent by a network device, where the one or more pieces of COT indication information are used to indicate start and end moments of one or more COTs. The network device sends one or more downlink reference signals to the terminal device within the one or more COTs.

S320: The terminal device detects the downlink reference signal within the one or more COTs based on the one or more pieces of COT indication information.

S330: The terminal device starts a second timer when detecting, within the one or more COTs, a downlink reference signal whose quality is less than a first detection threshold.

S340: Before the second timer expires, the terminal device determines a first downlink reference signal that is in the downlink reference signal detected within the one or more COTs and whose quality is less than the first detection threshold.

S350: The terminal device determines, based on a quantity of first downlink reference signals, whether to start a third timer.

Specifically, steps S310 and S320 are similar to the foregoing steps S210 and S220. For specific descriptions, refer to the foregoing descriptions of S210 and S220.

In S330, the terminal device detects the downlink reference signal within the COT (which may be one or more COTs), and starts the second timer when detecting the downlink reference signal whose quality is less than the first detection threshold. The second timer may be a timer (counter) N310. Due to impact of LBT on receiving the downlink reference signal, in addition to using the method 200 to compare a quantity of downlink reference signals that are continuously detected within duration of N310 and whose quality is less than the first detection threshold with a preset threshold of an OOS counter (or a configured quantity of downlink reference signals that are to be continuously detected within duration of N310 and whose quality is less than the first detection threshold), to determine whether a connection needs to be reestablished on a channel or whether the third timer T310 needs to be started, the terminal device may alternatively determine, based on a proportion of the downlink reference signal (the first downlink reference signal) that is detected within the duration of the second timer N310 and whose quality is less than the first detection threshold, whether the channel needs to be reconnected or whether the third timer T310 needs to be started. Therefore, in S340, before the second timer expires, the terminal device determines the first downlink reference signal that is in the downlink reference signal detected within the COT and whose quality is less than the first detection threshold, in other words, determines the quantity of first downlink reference signals that are in the downlink reference signal detected within the duration of N310 and whose quality is less than the first detection threshold. In S350, whether to start the third timer T310 is determined based on the quantity of first downlink reference signals.

For example, the terminal device detects, within the duration of N310, six downlink reference signals whose quality is less than the first detection threshold, and the configured (predefined) quantity of downlink reference signals that are to be continuously detected within the duration of N310 and whose quality is less than the first detection threshold is 10 (in other words, the preset threshold of the OOS counter is 10). A determining threshold may be predefined, and the determining threshold is a proportion, in the preset threshold of the OOS counter, of the quantity of downlink reference signals whose quality is less than the first detection threshold. If an actual proportion is greater than or equal to the determining threshold, it indicates that the channel quality is relatively poor, and the channel needs to be reconnected or the third timer (the timer T310) needs to be started. If an actual proportion is less than the determining threshold, it indicates that channel quality is relatively good, the channel does not need to be reconnected or the third timer does not need to be started, and the second timer (the timer N310) is reset. Assuming that the determining threshold is 90%, because the six downlink reference signals whose quality is less than the first detection threshold are detected within the duration of N310, and the configured (predefined) quantity of downlink reference signals that are to be continuously detected within the duration of N310 and whose quality is less than the first detection threshold is 10, the proportion of the downlink reference signals whose quality is less than the first detection threshold is 60% and is less than the determining threshold. This indicates that the channel quality is relatively good, the channel does not need to be reconnected or the third timer (the timer T310) does not need to be started, and the second timer (the timer N310) is reset.

It should be understood that the foregoing determining threshold may be defined in a standard, or may be configured by the network device and notified to the terminal device. A value of the determining threshold may be related to a value of N310. For example, shorter duration of N310 indicates a larger determining threshold.

Whether to start the third timer is determined based on the proportion, in the preset threshold of the OOS counter, of the quantity of downlink reference signals that are detected within the duration of the second timer (N310) and whose quality is less than the first detection threshold, so that impact of the LBT on N310 can be reduced, and accuracy of RLM can be improved, thereby ensuring normal communication between the network device and the terminal device.

Figure 7:
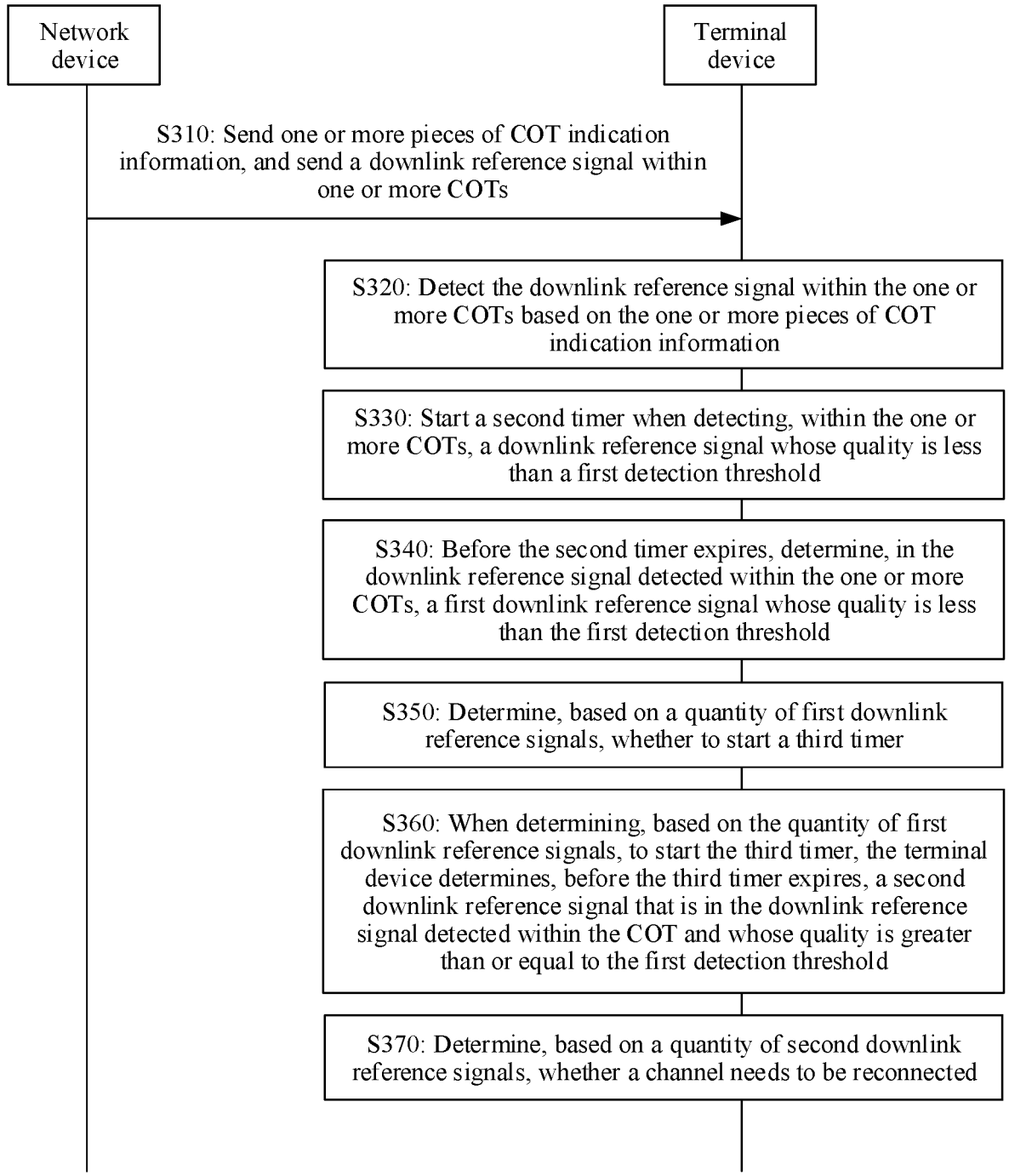
FIG. 7 is a schematic interaction diagram of still another method for radio link monitoring on an unlicensed spectrum according to an embodiment of this application.

When the terminal device determines, based on the quantity of first downlink reference signals, to start the third timer, as shown in FIG. 7, the method 300 further includes the following steps:

S360: Before the third timer expires, the terminal device determines a second downlink reference signal that is in the downlink reference signal detected within the one or more COTs and whose quality is greater than or equal to the first detection threshold.

S370: The terminal device determines, based on a quantity of second downlink reference signals, whether the channel needs to be reconnected.

Specifically, due to the impact of the LBT on the receiving of the downlink reference signal, in addition to comparing N311 (a preset threshold of an IS counter) with a quantity of downlink reference signals that are continuously detected within duration of T310 and whose quality is greater than or equal to the first detection threshold, to determine whether the channel needs to be reconnected, the terminal device may alternatively determine, based on the quantity of second downlink reference signals that are in the downlink reference signal detected within the duration of T310 and whose quality is greater than or equal to the first detection threshold, whether the channel needs to be reconnected. For example, the terminal device detects, within the duration of T310, eight downlink reference signals whose quality is greater than or equal to the first detection threshold, and the preset threshold of the IS counter is configured (predefined) as 10. A determining threshold may be predefined, and the determining threshold is a proportion, in the preset threshold of the IS counter (a value of N311 in T310), of the quantity of downlink reference signals whose quality is greater than or equal to the first detection threshold. If an actual proportion is greater than or equal to the determining threshold, it indicates that the channel quality is good, and the channel does not need to be reconnected. If an actual proportion is less than the determining threshold, it indicates that the channel quality is poor, and the channel needs to be reconnected. Assuming that the determining threshold is 90%, because the eight downlink reference signals whose quality is greater than or equal to the first detection threshold are detected within the duration of T310, and the preset threshold of the IS counter is configured (predefined) as 10, the proportion of the downlink reference signal whose quality is greater than or equal to the first detection threshold is 80%, and is less than the determining threshold. This indicates that the channel quality is poor, and the channel needs to be reconnected.

It should be understood that the foregoing determining threshold may be defined in a standard, or may be configured by the network device and notified to the terminal device. A value of the determining threshold may be related to the value of N311. For example, a smaller value of N311 indicates a larger determining threshold.

Whether the channel needs to be reconnected is determined based on the proportion, in N311, of the quantity of downlink reference signals that are detected within the duration of the third timer (T310) and whose quality is greater than or equal to the first detection threshold, so that impact of the LBT on N311 can be reduced, and the accuracy of the RLM can be improved, thereby ensuring the normal communication between the network device and the terminal device.

Figure 8:
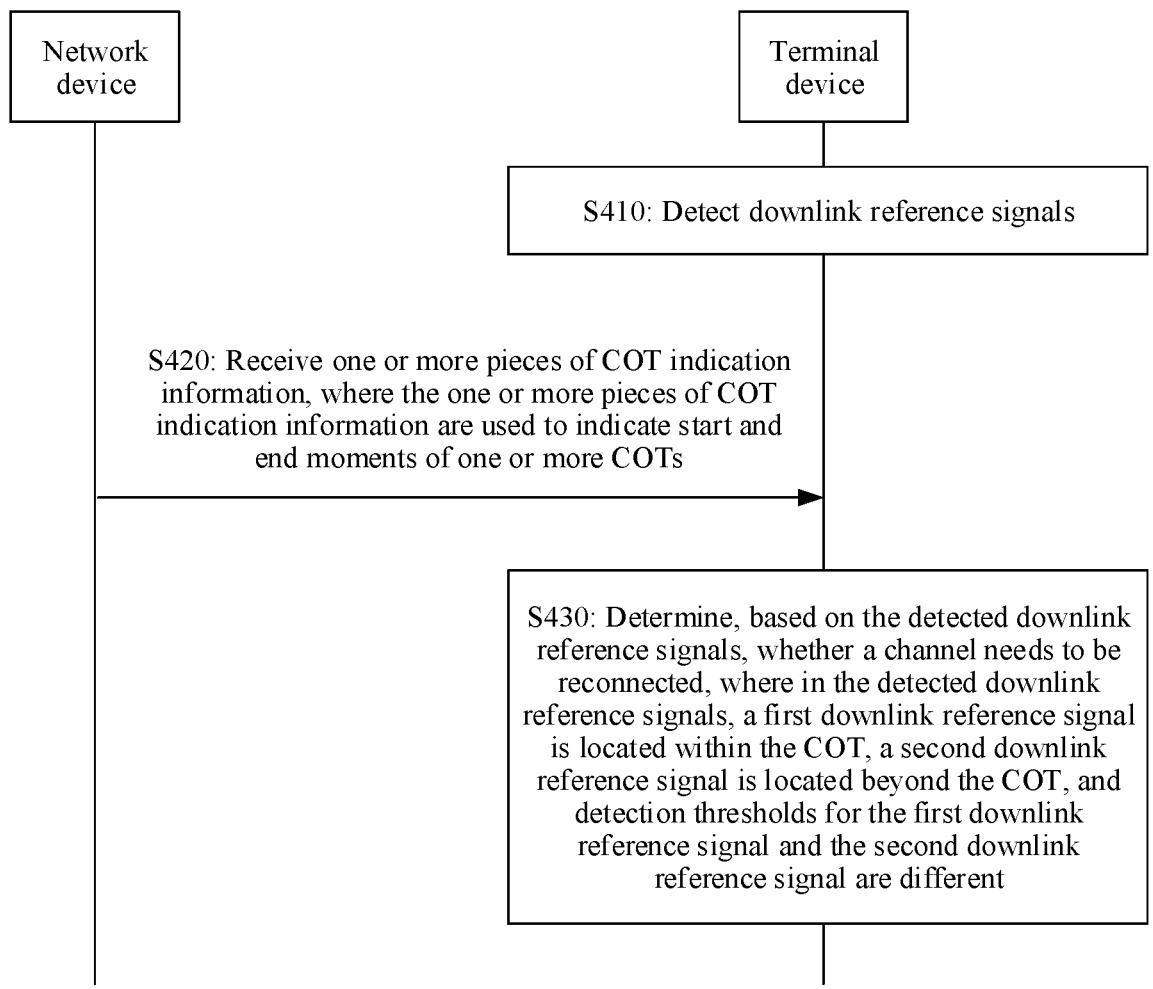
FIG. 8 is a schematic interaction diagram of still another method for radio link monitoring on an unlicensed spectrum according to an embodiment of this application.

FIG. 8 is a schematic flowchart of a method 400 for radio link monitoring on an unlicensed spectrum according to another embodiment of this application. The method 400 shown in FIG. 8 may include step S410 to step S430. The following describes the steps in the method 400 in detail with reference to FIG. 8.

As shown in FIG. 8, the method 400 includes the following steps.

S410: A terminal device detects downlink reference signals.

S420: The terminal device receives one or more pieces of COT indication information sent by a network device, where the one or more pieces of COT indication information are used to indicate start and end moments of one or more COTs. That is, one piece of COT indication information is used to indicate a start moment and an end moment of one COT, and a plurality of pieces of COT indication information are used to indicate start and end moments of a plurality of COTs. The network device sends the downlink reference signals to the terminal device within and beyond the one or more COTs.

S430: The terminal device determines, based on the detected downlink reference signals, whether a channel needs to be reconnected, where in the detected downlink reference signals, a first downlink reference signal is located within the COT, a second downlink reference signal is located beyond the COT, and detection thresholds for the first downlink reference signal and the second downlink reference signal are different.

Specifically, in S410, the terminal device may continuously detect the downlink reference signals on preconfigured resources for the downlink reference signals. Continuous detection may be understood as that the terminal device detects the downlink reference signals on all the preconfigured time-frequency resources for the downlink reference signals.

In S420, the terminal device receives the COT indication information sent by the network device, where the COT indication information is used to indicate the start and end moments of the one or more COTs. The network device sends the downlink reference signals to the terminal device within and beyond the one or more COTs. The COT indication information may further indicate, in the downlink reference signals that have been detected by the terminal device, which signal is located within the COT and which signal is located beyond the COT.

In S430, the terminal device determines, based on the detected downlink reference signals and the COT indication information, whether the channel needs to be reconnected. In the downlink reference signals detected by the terminal device, the first downlink reference signal is located within the COT, the second downlink reference signal is located beyond the COT, and the detection thresholds for the first downlink reference signal and the second downlink reference signal are different. There is a specific false detection probability for downlink control information used to deliver the COT indication information, and when interference on a network device side is relatively strong, a quantity of downlink reference signals located within the COT in a time period (for example, before an OOS counter expires) is relatively small. Consequently, accuracy of RLM determining performed by the terminal device is affected. Therefore, the terminal device may further perform RLM by using the downlink reference signal detected beyond the COT, in other words, perform RLM by using the downlink reference signals detected within and beyond the COT. This can reduce impact of LBT on N311, and improve the accuracy of the RLM, thereby ensuring normal communication between the network device and the terminal device.

Figure 9:
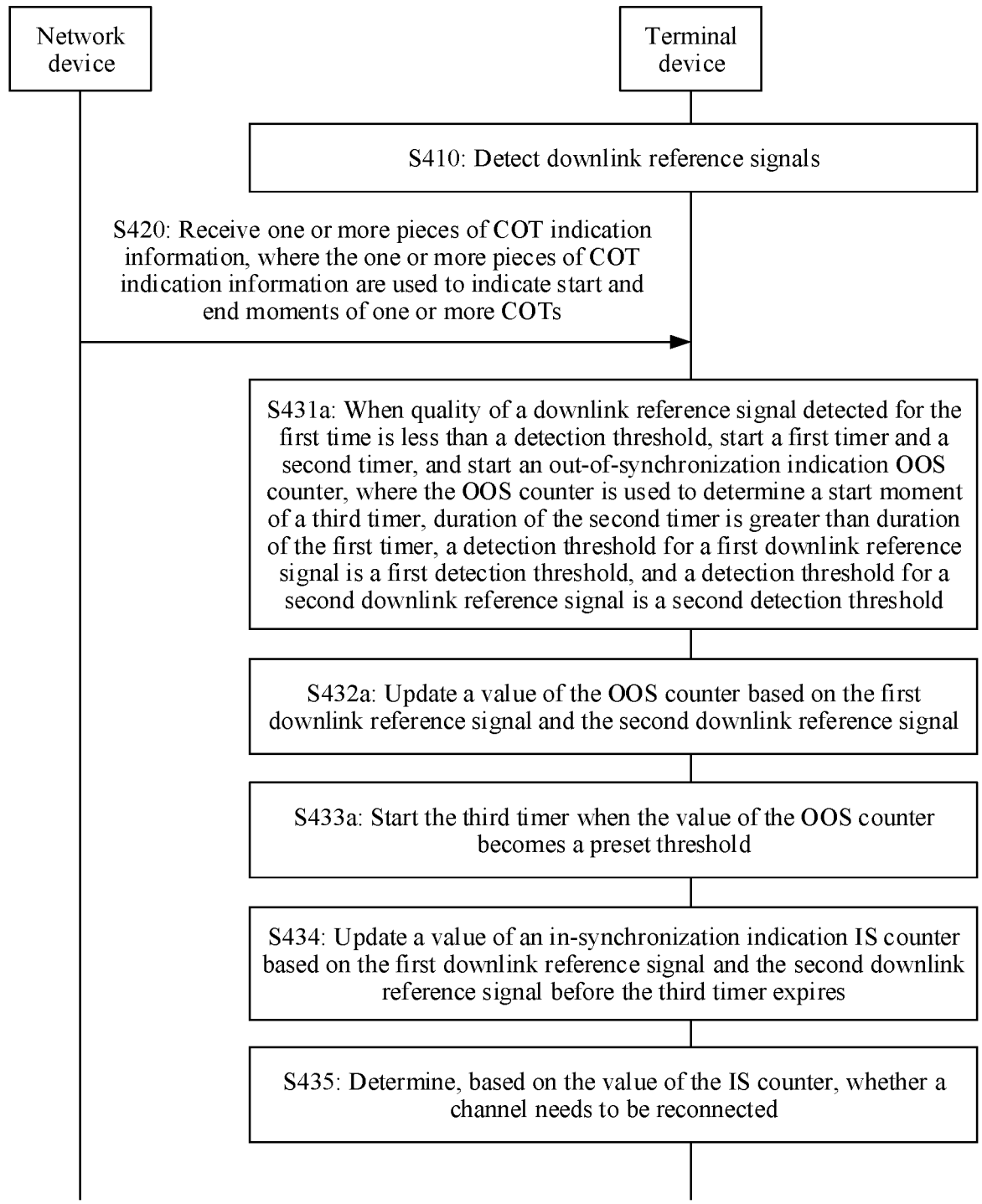
FIG. 9 is a schematic interaction diagram of still another method for radio link monitoring on an unlicensed spectrum according to an embodiment of this application.

Optionally, in an embodiment, as shown in FIG. 9, step S430 may include the following steps.

S431a: When quality of a downlink reference signal detected for the first time is less than the detection threshold, start a first timer and a second timer, and start the out-of-synchronization indication OOS counter, where the OOS counter is used to determine a start moment of a third timer, duration of the second timer is greater than duration of the first timer, the detection threshold for the first downlink reference signal is a first detection threshold, the detection threshold for the second downlink reference signal is a second detection threshold, and the first detection threshold is not equal to the second detection threshold.

S432a: Update a value of the OOS counter based on the first downlink reference signal and the second downlink reference signal.

S433a: Start the third timer when the value of the OOS counter becomes a preset threshold.

S434: Update a value of an in-synchronization indication IS counter based on the first downlink reference signal and the second downlink reference signal before the third timer expires.

S435: Determine, based on the value of the IS counter, whether the channel needs to be reconnected.

After determining the COT indication information, the terminal device may determine the start and end moments of the one or more COTs, so that information such as a time domain position beyond the COT can also be determined. The terminal device may detect the downlink reference signals beyond and within the COT. Because interference to the downlink reference signal located beyond the COT is relatively strong, the detection threshold (the second detection threshold) for the second downlink reference signal located beyond the COT may be different from the detection threshold (the first detection threshold) for the first downlink reference signal located within the COT. The second detection threshold may be for an RSRP, RSRQ, and/or the like of the downlink reference signal. Optionally, the second detection threshold may be determined based on the first detection threshold, and the first detection threshold and the second detection threshold may satisfy a function relationship. For example, the second detection threshold=the first detection threshold+an offset value. The offset value may be configured by the network device and notified to the terminal device, may be adjusted by the terminal device based on the downlink reference signal sent by the network device, or may be defined in a protocol.

In S431a, when detecting, for the first time within the COT, a first downlink reference signal whose quality is less than the first detection threshold, the terminal device starts the first timer and the second timer, and starts the OOS counter, where the OOS counter is used to determine the start moment of the third timer, and the duration of the first timer is greater than the duration of the second timer. Alternatively, when detecting, for the first time beyond the COT, a second downlink reference signal whose quality is less than the second detection threshold, the terminal device starts the first timer and the second timer, and starts the OOS counter. The first timer may be Tc described above, the second timer may be a timer N310, and the third timer may be a timer T310. That is, the downlink reference signal that triggers start of the first timer and the second timer may be located within the COT, or may be located beyond the COT. For descriptions of the first timer and the second timer, refer to the related descriptions in the foregoing several embodiments. Details are not described herein again. The OOS counter is started when the second timer N310 is started. The OOS counter is used to determine the start moment of the third timer.

In step S432a, after the first timer Tc and the second timer N310 are started, the terminal device updates the value of the OOS counter based on the first downlink reference signal detected within the COT and the second downlink reference signal detected beyond the COT.

Specifically, in step 432a, before the first timer expires, when no downlink reference signal is detected within or beyond the COT, the terminal device updates the value of the OOS counter (for example, increases the value of the OOS counter by 1). After the first timer Tc and the second timer N310 are started, if the terminal device detects, within the COT, a first downlink reference signal whose quality is greater than or equal to the first detection threshold or detects, beyond the COT, a second downlink reference signal whose quality is greater than or equal to the second detection threshold, it indicates that quality of a radio link between the terminal device and the network device is relatively good, the first timer Tc and the second timer N310 are reset, that is, the first timer Tc and the second timer N310 are set to 0, the OOS counter is reset (set to 0), and it is determined that the channel (the radio link) between the terminal device and the network device does not need to be reconnected.

After the first timer Tc and the second timer N310 are started, regardless of whether Tc or N310 expires, the first timer Tc, the second timer N310, and the OOS counter are reset (set to 0) as long as the first downlink reference signal whose quality is greater than or equal to the first detection threshold is detected within the COT or the second downlink reference signal whose quality is greater than or equal to the second detection threshold is detected beyond the COT. After the first timer Tc and the second timer N310 are reset, if a first downlink reference signal whose quality is less than the first detection threshold is further detected within the COT or a second downlink reference signal whose quality is less than the second detection threshold is further detected beyond the COT, the first timer Tc and the second timer N310 are restarted, and the value of the OOS counter starts to be updated.

Before a moment at which the first timer expires (becomes invalid), if a first downlink reference signal whose quality is less than the first detection threshold is detected within the COT, the value of the OOS counter is updated (for example, the value of the OOS counter may be increased by 1), and the first timer Tc is reset. If a second downlink reference signal whose quality is less than the second detection threshold is detected beyond the COT, the value of the OOS counter is updated (for example, the value of the OOS counter may be increased by 0.5), and the first timer Tc is reset.

The terminal device updates the value of the OOS counter based on the first downlink reference signal detected within the COT and the second downlink reference signal detected beyond the COT. In S433a, the terminal device starts the third timer when the value of the OOS counter becomes the preset threshold. In S434, before the third timer expires, the terminal device updates the value of in-synchronization indication IS counter based on the downlink reference signal detected within the COT and the downlink reference signal detected beyond the COT. For related descriptions of the IS counter, refer to the descriptions in the foregoing embodiments, and details are not described herein again. In S435, the terminal device determines, based on the value of the IS counter, whether the channel needs to be reconnected. In other words, the terminal device may alternatively update the IS counter by using the downlink reference signal detected within the COT and the downlink reference signal detected beyond the COT, to determine channel quality.

It should be understood that the network device may preconfigure parameters such as a sending time-frequency position, a transmit density, and a transmit power of the downlink reference signal located within the COT, and may additionally configure parameters such as a transmit density and a transmit power of the downlink reference signal located beyond the COT.

It should be further understood that whether the terminal device needs to update the value of the IS counter or the OOS counter by using the downlink reference signal located beyond the COT may be directly indicated in a standard; or may be dynamically adjusted by the network device based on a feedback of the terminal device or other information, and then notified to the terminal device in a downlink broadcast/unicast manner.

According to the foregoing method, the RLM is performed by using the RSs detected within and beyond the COT, so that the accuracy of the RLM can be improved, thereby further ensuring the communication between the terminal device and the network device. In the foregoing step S432a, the terminal device updates the value of the OOS counter based on the first downlink reference signal detected within the COT and the second downlink reference signal detected beyond the COT. In a possible manner of updating the value of the OOS counter, the updating, by the terminal device, the value of the OOS counter based on the first downlink reference signal detected within the COT and the second downlink reference signal detected beyond the COT includes:

the updating the value of the OOS counter includes increasing the value of the OOS counter by 1;
increasing the value of the OOS counter by 1 when N first downlink reference signals whose quality is less than the first detection threshold are continuously detected within the COT; and
increasing the value of the OOS counter by 1 when M second downlink reference signals whose quality is less than the second detection threshold are continuously detected beyond the COT, where both M and N are positive integers, and M is greater than or equal to N.

Specifically, because the downlink reference signal located beyond the COT is vulnerable to interference, for the update of the value of the OOS counter, a proportion of the downlink reference signal located beyond the COT is different from a proportion of the downlink reference signal located within the COT. In a possible implementation, assuming that when the N first downlink reference signals whose quality is less than the first detection threshold are continuously detected within the COT, the value of the OOS counter is increased by 1, when the M second downlink reference signals are continuously detected beyond the COT, the value of the OOS counter is increased by 1, where both M and N are positive integers, and M is greater than or equal to N. For example, when one downlink reference signal whose quality is less than the first detection threshold is detected within the COT, the value of the OOS counter is increased by 1. In this case, only when two downlink reference signals whose quality is less than the second threshold are continuously detected beyond the COT, the value of the OOS counter is increased by 1.

In another possible implementation, when one downlink reference signal whose quality is less than the first detection threshold is detected within the COT, the value of the OOS counter is increased by C; when one downlink reference signal whose quality is less than the second detection threshold is detected beyond the COT, the value of the OOS counter is increased by D, where D is less than or equal to C. Herein, C and D may be integers or may be decimals.

It should be understood that the foregoing two possible implementations are merely used to describe a case in which for the update of the value of the OOS counter, the proportion of the downlink reference signal located beyond the COT is different from the proportion of the downlink reference signal located within the COT. In a specific implementation process, there may be another possible implementation. This is not limited in this embodiment of this application.

According to the foregoing method, the value of the OOS counter is updated based on both the downlink reference signal that is detected within the COT and whose quality is less than the first detection threshold and the downlink reference signal that is detected beyond the COT and whose quality is less than the second detection threshold, and for the update of the value of the OOS counter, the proportion of the downlink reference signal located within the COT is different from the proportion of the downlink reference signal located beyond the COT, thereby properly using the downlink reference signals located within and beyond the COT. Impact of the LBT on receiving of the downlink reference signal by the terminal device is further reduced, and the accuracy of the RLM performed by the terminal device based on the downlink reference signals is improved.

It should be understood that values of M and N and values of C and D may be configured by the network device and notified to the terminal device, or may be defined in a standard.

Optionally, because the downlink reference signal located beyond the COT is vulnerable to interference, a transmit power of the second downlink reference signal located beyond the COT may be less than a transmit power of the first downlink reference signal located within the COT. For example, in preconfigured sending positions of the downlink reference signals, the downlink reference signals may be sent in all the preconfigured sending positions of the downlink reference signals within the COT. For the second downlink reference signal located beyond the COT, the downlink reference signal may be sent in a part of preconfigured sending positions of downlink reference signals, in other words, only a part of downlink reference signals are sent beyond the COT. For example, only a downlink reference signal with an odd number or an even number is sent beyond the COT.

The value of the OOS counter is updated based on both the downlink reference signal that is detected within the COT and whose quality is less than the first detection threshold and the downlink reference signal that is detected beyond the COT and whose quality is less than the second detection threshold. When the value of the OOS counter reaches the preset threshold, the third timer (T310) is started. After the third timer is started, whether the channel needs to be reconnected needs to be determined based on the value of the IS counter.

In the foregoing step S434, before the third timer expires, the terminal device updates the value of the IS counter based on the first downlink reference signal detected within the COT and the second downlink reference signal detected beyond the COT. In other words, within duration of the third timer, the terminal device updates the value of the IS counter based on the downlink reference signal detected within the COT and the downlink reference signal detected beyond the COT.

Specifically, after the third timer T310 is started, because the third timer T310 may be started within the COT or beyond the COT, if detecting, within the COT, a first downlink reference signal whose quality is greater than or equal to the first detection threshold, the terminal device starts the IS counter; or if detecting, beyond the COT, a second downlink reference signal whose quality is greater than or equal to the second detection threshold, the terminal device starts the IS counter.

Because the downlink reference signal located beyond the COT is vulnerable to interference, for the update of the value of the IS counter, a proportion of the downlink reference signal located beyond the COT is different from a proportion of the downlink reference signal located within the COT.

In a possible implementation, assuming that within the duration of T310, the value of the IS counter is increased by 1 when W downlink reference signals whose quality is greater than or equal to the first detection threshold are continuously detected within the COT, only when Y downlink reference signals whose quality is greater than or equal to the second detection threshold are continuously detected beyond the COT, the value of the IS counter is increased by 1. Both W and Y are positive integers, and W is less than or equal to Y. For example, W is 1, and Y is 4.

In another possible implementation, it is assumed that within the duration of T310, when one downlink reference signal whose quality is greater than or equal to the first detection threshold is detected within the COT, the value of the IS counter is increased by A; when one downlink reference signal whose quality is greater than or equal to the second detection threshold is detected beyond the COT, the value of the IS counter is increased by B, where B is less than or equal to A. Herein, A and B may be integers or may be decimals.

Values of W and Y and values of A and B may be configured by the network device and notified to the terminal device, or may be defined in a standard.

It should be understood that the foregoing two possible implementations are merely used to describe a case in which for the update of the value of the IS counter, the proportion of the downlink reference signal located beyond the COT is different from the proportion of the downlink reference signal located within the COT. In a specific implementation process, there may be another possible implementation. This is not limited in this embodiment of this application.

The value of the IS counter is updated by using both the downlink reference signal detected beyond the COT and the downlink reference signal detected within the COT. When the value of the IS counter reaches a preset threshold within the duration of T310, it indicates that the channel quality is relatively good, and the channel does not need to be reconnected. When the value of the IS counter does not reach a preset threshold within the duration of T310, it indicates that the channel quality is relatively poor, and the channel needs to be reconnected.

It should be understood that, within the duration of T310, after the IS counter is started, the IS counter is reset if a downlink reference signal whose quality is less than the first detection threshold is detected within the COT. The IS counter is also reset if a downlink reference signal whose quality is greater than or equal to the second detection threshold is detected beyond the COT. After the IS counter is reset, if a condition (that a downlink reference signal whose quality is greater than or equal to the first detection threshold is detected within the COT, or a downlink reference signal whose quality is greater than or equal to the second detection threshold is detected beyond the COT) for starting the IS counter is subsequently met, the IS counter is restarted, and the value of the IS counter is updated.

According to the foregoing method, the terminal device performs RLM by using the downlink reference signals detected within and beyond the COT, and contributions of the downlink reference signals within and beyond the COT to the update of the values of OOS counter and the IS counter are different. The downlink reference signals under different conditions are properly used, thereby improving resource utilization. In this way, a result of the RLM can be more accurate.

Figure 10:
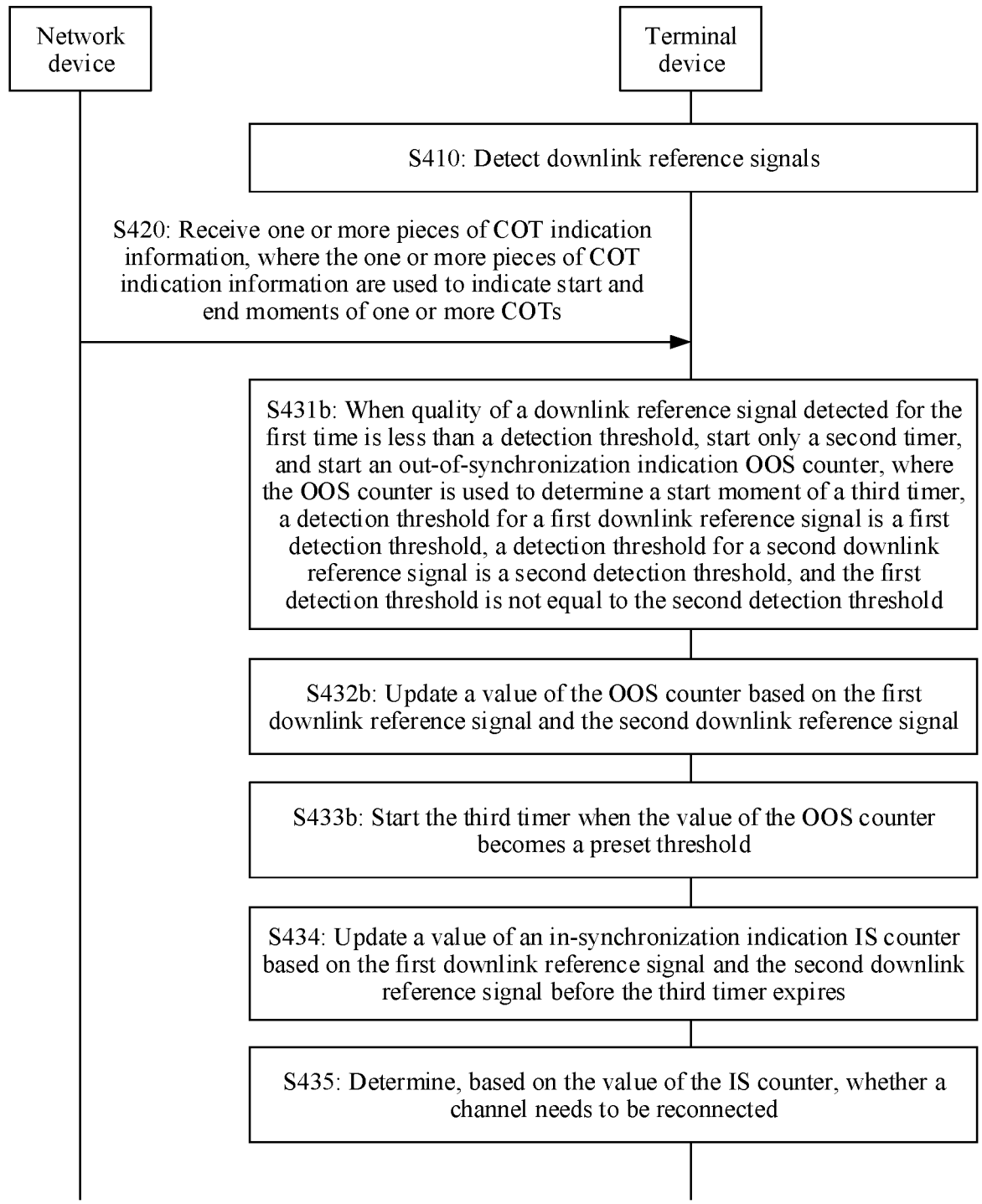
FIG. 10 is a schematic interaction diagram of still another method for radio link monitoring on an unlicensed spectrum according to an embodiment of this application.

Optionally, in another embodiment, as shown in FIG. 10, in the method 400, step S430 may include the following substeps.

S431b: When quality of a downlink reference signal detected for the first time is less than the detection threshold, start only a second timer, and start the out-of-synchronization indication OOS counter, where the OOS counter is used to determine a start moment of a third timer, the detection threshold for the first downlink reference signal is a first detection threshold, the detection threshold for the second downlink reference signal is a second detection threshold, and the first detection threshold is not equal to the second detection threshold.

S432b: Update a value of the OOS counter based on the first downlink reference signal and the second downlink reference signal.

S433b: Start the third timer when the value of the OOS counter becomes a preset threshold.

S434: Update a value of an in-synchronization indication IS counter based on the first downlink reference signal and the second downlink reference signal before the third timer expires.

S435: Determine, based on the value of the IS counter, whether the channel needs to be reconnected.

Specifically, in S432b, the updating a value of the OOS counter based on the first downlink reference signal and the second downlink reference signal includes:

by a moment at which the second timer expires, when a first downlink reference signal whose quality is less than the first detection threshold is detected within the COT, updating the value of the OOS counter; or when a second downlink reference signal whose quality is less than the second detection threshold is detected beyond the COT, updating the value of the OOS counter; and when a first downlink reference signal whose quality is greater than or equal to the first detection threshold is detected within the COT, resetting the second timer, and resetting the OOS counter; or when a second downlink reference signal whose quality is greater than or equal to the second detection threshold is detected beyond the COT, resetting the second timer, and resetting the OOS counter.

It should be understood that, for related descriptions of the foregoing steps, refer to the related descriptions in the embodiment shown in FIG. 9. A difference from the embodiment shown in FIG. 9 lies in that, in S431b, only the second timer is started, and the first timer is not started, that is, the first timer may not exist.

Figure 11:
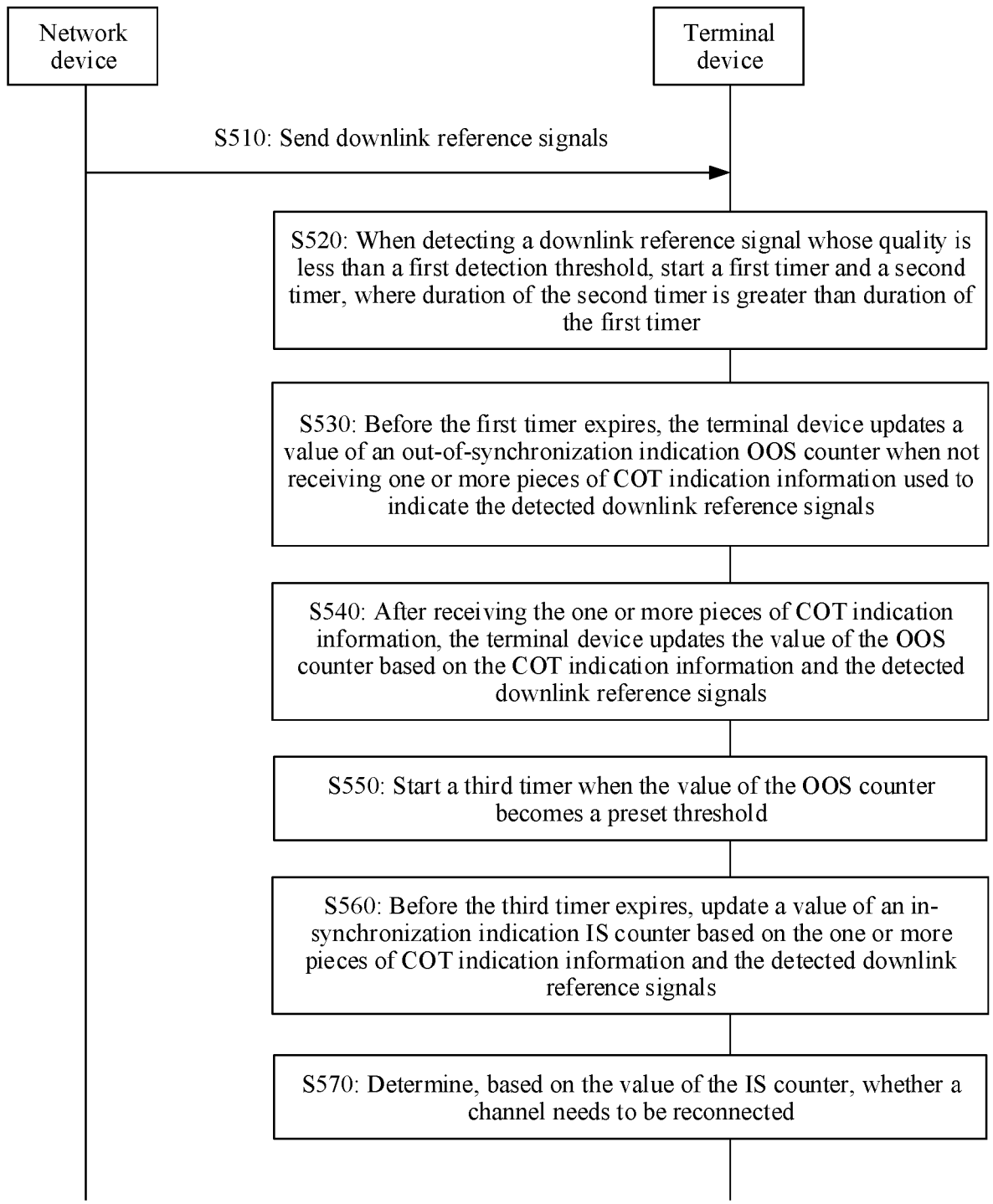
FIG. 11 is a schematic interaction diagram of still another method for radio link monitoring on an unlicensed spectrum according to an embodiment of this application.

FIG. 11 is a schematic flowchart of a method 500 for radio link monitoring on an unlicensed spectrum according to another embodiment of this application.

As shown in FIG. 11, the method 500 shown in FIG. 11 may include step S510 to step S570. The following describes the steps in the method 500 in detail with reference to FIG. 11.

As shown in FIG. 11, the method 500 includes the following steps.

S510: A network device sends downlink reference signals to a terminal device; correspondingly, the terminal device performs detection on resources for detecting the downlink reference signals.

S520: When detecting a downlink reference signal whose quality is less than a first detection threshold, the terminal device starts a first timer and a second timer, where duration of the second timer is greater than duration of the first timer.

S530: Before the first timer expires, the terminal device updates a value of an out-of-synchronization indication OOS counter when not receiving one or more pieces of COT indication information used to indicate the detected downlink reference signals, where the one or more pieces of COT indication information are used to indicate start and end moments of one or more COTs, and the OOS counter is used to determine a start moment of a third timer.

S540: After receiving the one or more pieces of COT indication information, the terminal device updates the value of the OOS counter based on the one or more pieces of COT indication information and the detected downlink reference signals.

S550: The terminal device starts the third timer when the value of the OOS counter becomes a preset threshold.

S560: Before the third timer expires, the terminal device updates a value of an in-synchronization indication IS counter based on the COT indication information and the detected downlink reference signals.

S570: The terminal device determines, based on the value of the IS counter, whether a channel needs to be reconnected.

Specifically, in S510, the terminal device detects the downlink reference signals on all the preconfigured resources for downlink reference signals, and stores a detection result. The detection result may be energy values, signal strength, or the like of the detected downlink reference signals. For example, the detection result may be RSRPs and/or RSRQ. The preconfigured time-frequency resources for the downlink reference signals may be pre-notified by the network device to the terminal device, or may be defined in a standard. In S520, when detecting the downlink reference signal whose quality is less than the first detection threshold, the terminal device starts the first timer and the second timer, and starts the OOS counter. The first timer may be the foregoing timer Tc, and the second timer may be the foregoing timer N310. The duration of the second timer is greater than the duration of the first timer. For descriptions of the first timer and the second timer, refer to the related descriptions in the foregoing embodiments. For brevity, details are not described herein again. In S530, before the first timer expires, the terminal device updates the value of the OOS counter (for example, increases the value of the OOS counter by 1) when not receiving the channel occupancy time COT indication information used to indicate the detected downlink reference signals. The OOS counter is used to determine the start moment of the third timer. The third timer may be the foregoing timer T310. The one or more pieces of COT indication information may be used to indicate start moments, end moments, and the like of one or more previous COTs to the terminal device. The terminal device may determine, based on the one or more pieces of COT indication information, which downlink reference signal that has been detected is located within the COT and which downlink reference signal that has been detected is located beyond the COT; or may determine which downlink reference signals are located within a same COT and which downlink reference signal is located within another COT. For example, the terminal device has detected 10 downlink reference signals, and the 10 downlink reference signals are distributed within three non-consecutive COTs. For example, the three COTs are respectively a COT 1, a COT 2, and a COT 3. The terminal device may determine, in the 10 downlink reference signals based on the COT indication information, which downlink reference signal is located within the COT 1, which downlink reference signal is located within the COT 2, which downlink reference signal is located within the COT 3, and which downlink reference signal is located beyond the COTs. In S540, after receiving the COT indication information, the terminal device may update the value of the OOS counter based on the COT indication information and the detected downlink reference signals. Specifically, the COT indication information may be sent to the terminal device by using a downlink identification signal, RTS, CTS, a group-common PDCCH, or the like. In S550, the terminal device starts the third timer when the value of the OOS counter becomes the preset threshold. In S560, before the third timer expires, the terminal device updates the value of the in-synchronization indication IS counter based on the COT indication information and the detected downlink reference signals. In S570, the terminal device determines, based on the value of the IS counter, whether the channel needs to be reconnected.

According to the foregoing method, RLM is performed by using the RSs that have been detected before, so that accuracy of the RLM can be improved, thereby ensuring communication between the terminal device and the network device.

It should be understood that, specific update procedures in which after receiving the COT indication information, the terminal device updates the value of OOS counter and the IS counter based on the COT indication information and the detected downlink reference signals are similar to the procedures for updating the values of the OOS counter and the IS counter in the methods 200 to 400.

In S540, that after receiving the COT indication information, the terminal device updates the value of the OOS counter based on the COT indication information and the detected downlink reference signals includes:

determining, by the terminal device in the detected downlink reference signals, a downlink reference signal located within the COT and a downlink reference signal located beyond the COT; and updating, by the terminal device, the value of the OOS counter based on the downlink reference signal located within the COT and the downlink reference signal located beyond the COT.

Specifically, because the downlink reference signal located beyond the COT is vulnerable to interference, for the update of the value of the OOS counter, a proportion of the downlink reference signal located beyond the COT is different from a proportion of the downlink reference signal located within the COT. Therefore, after receiving the COT indication information, the terminal device may determine, based on the COT indication information, which downlink reference signal that has been detected is located within the COT and which downlink reference signal that has been detected is located beyond the COT; and then update the value of the OOS counter based on the downlink reference signal located within the COT and the downlink reference signal located beyond the COT, so that the downlink reference signals under different conditions can be properly used, thereby improving resource utilization. In this way, a result of the RLM can be more accurate.

Similarly, in S560, before the third timer expires, the terminal device updates the value of the IS counter based on the COT indication information and the detected downlink reference signals, namely, the downlink reference signal located within the COT and the downlink reference signal located beyond the COT, thereby improving the resource utilization. In this way, the result of the RLM can be more accurate.

It should be understood that a specific process in which the terminal device updates the value of the OOS counter and a specific process in which the terminal device updates the value of the IS counter are similar to the processes in which the terminal device updates the value of OOS counter and the IS counter based on the downlink reference signals detected within and beyond the COT in the method 400. For brevity, details are not described herein again.

In NR, in addition to the foregoing downlink reference signal, a downlink reference signal included in a discovery reference signal (DRS) may be further used by the terminal device to perform RLM. The downlink reference signal included in the DRS is referred to as a special downlink reference signal below for differentiation. A time-frequency position for sending the DRS is different from a time-frequency position for sending the foregoing downlink reference signal. For example, the downlink reference signal is sent on the third to the fifth symbols in each slot, and the DRS is sent only on the ninth to the eleventh symbols in a part of slots. When detecting the DRS, the terminal device first blindly detects a primary synchronization signal (PSS)/secondary synchronization signal (SSS), and then blindly detects a PBCH. Therefore, a probability that the terminal device correctly detects the DRS is relatively high, and RLM performed by the terminal device by using the special downlink reference signal included in the DRS is more accurate. In the foregoing embodiments, the downlink reference signal detected beyond the COT and the downlink reference signal detected within the COT may include a preconfigured downlink reference signal, and may further include the special downlink reference signal.

Therefore, in the foregoing embodiments of this application, when updating the values of the OOS counter and the IS counter, the terminal device may further update the values of the OOS counter and the IS counter based on the detected special downlink reference signal. In this way, the accuracy and precision of the RLM performed by the terminal device can be improved.

For example, when updating the value of the OOS counter, the terminal device may update the value of the OOS counter by using the special downlink reference signal and the downlink reference signal that are detected within the COT; or may update the value of the OOS counter by using the downlink reference signals detected within and beyond the COT; or may update the value of the OOS counter by using the special downlink reference signal and the downlink reference signal that are detected within the COT and the special downlink reference signal and the downlink reference signal that are detected beyond the COT. When updating the value of the IS counter, the terminal device may update the value of the IS counter by using the special downlink reference signal and the downlink reference signal that are detected within the COT; or may update the value of the IS counter by using the downlink reference signals detected within and beyond the COT; or may update the value of the IS counter by using the special downlink reference signal and the downlink reference signal that are detected within the COT and the special downlink reference signal and the downlink reference signal that are detected beyond the COT.

Specifically, because the probability that the DRS is correctly detected is relatively high, for the update of the values of the OOS counter and the IS counter, a proportion of the detected special downlink reference signal should be relatively high. For example, in a possible implementation, for the update of the value of the OOS counter, when L special downlink reference signals whose quality is less than a third detection threshold are continuously detected, the value of the OOS counter is increased by 1; when P first downlink reference signals whose quality is less than the first detection threshold are continuously detected within the COT, the value of the OOS counter is increased by 1; when R downlink reference signals whose quality is less than a second detection threshold are continuously detected beyond the COT, the value of the OOS counter is increased by 1. R, P, and L are all positive integers, P is greater than or equal to L, and R is greater than or equal to P. For example, values of R, P, and L may be respectively 3, 2, and 1. Similarly, for the update of the value of the IS counter, the proportion of the special downlink reference signal and a proportion of the configured downlink reference signal are also different. The third detection threshold for the special downlink reference signal may be the same as or different from the first detection threshold for the downlink reference signal within the COT.

In another possible implementation, when one special downlink reference signal whose quality is less than a third detection threshold is detected, the value of the OOS counter is increased by F. When one first downlink reference signal whose quality is less than the first detection threshold is detected within the COT, the value of the OOS counter is increased by O. When one downlink reference signal whose quality is less than a second detection threshold is detected beyond the COT, the value of the OOS counter is increased by J. F, O, and J may be integers, or may be decimals. F is greater than or equal to O, and O is greater than or equal to J.

Values of R, P, L, F, O, and J may be configured by the network device and notified to the terminal device, or may be defined in a standard.

It should be understood that the foregoing two possible implementations are merely used to describe a case in which for the update of the values of the IS counter and the OOS counter, the proportions of the downlink reference signal included in the DRS, the downlink reference signal located beyond the COT, and the downlink reference signal located within the COT are different. In a specific implementation process, there may be another possible implementation. This is not limited in this embodiment of this application.

It should be understood that, for the special downlink reference signal included in the DRS, a configuration parameter (a sending position, a sending periodicity, and the like of the DRS) of the special downlink reference signal may be fixed in a standard, or may be configured by the network device based on a requirement and notified to the terminal device in a downlink broadcast/unicast manner. The values of R, P, and L may also be fixed in a standard, or may also be configured by the network device and notified to the terminal device.

It should be further understood that whether the terminal device needs to update the value of the IS counter or the OOS counter by using the special downlink reference signal included in the DRS may be directly indicated in a standard; or may be dynamically adjusted by the network device based on a feedback of the terminal device or other information, and then notified to the terminal device in a downlink broadcast/unicast manner.

It should be understood that, in the foregoing embodiments of this application, the foregoing downlink reference signal may include one or more of a CSI-RS, a CRS, a PRS, and a DMRS. This is not limited in the embodiments of this application.

It should be further understood that division into manners, cases, types, and embodiments in the embodiments of this application is merely for ease of description, but should not constitute any special limitation, and features in various manners, types, cases, and embodiments may be combined when there is no contradiction.

It should be further understood that in the embodiments of this application, terms such as "first" and "second" are merely used to indicate that a plurality of objects are different. For example, the first downlink reference signal and the second downlink reference signal are merely used to represent different reference signals, and should not affect the reference signals. The terms such as "first" and "second" should not impose any limitation on the embodiments of this application.

It should be further understood that the foregoing descriptions are merely intended to help a person skilled in the art better understand the embodiments of this application, but are not intended to limit the scope of the embodiments of this application. It is clear that a person skilled in the art may make various equivalent modifications or changes based on the foregoing examples. For example, some steps in the method 200 to the method 500 may be unnecessary, some steps may be newly added, or any two or more of the foregoing embodiments may be combined. Such modified, changed, or combined solutions also fall within the scope of the embodiments of this application.

It should be further understood that, the foregoing descriptions of the embodiments of this application focus on differences between the embodiments. For same or similar parts that are not mentioned, refer to each other. For brevity, details are not described herein again.

It should be further understood that sequence numbers of the foregoing processes do not mean execution sequences. The execution sequences of the processes should be determined according to functions and internal logic of the processes, and should not be construed as any limitation on the implementation processes of the embodiments of this application.

It should be further understood that in the embodiments of this application, "presetting" and "predefinition" may be implemented by pre-storing corresponding code or a corresponding table in a device (for example, a terminal device and a network device), or may be implemented in another manner that may be used to indicate related information. A specific implementation thereof is not limited in this application.

The foregoing describes in detail the method for radio link monitoring on an unlicensed spectrum in the embodiments of this application with reference to FIG. 2 to FIG. 11. The following describes in detail communications apparatuses in the embodiments of this application with reference to FIG. 12 to FIG. 16.

Figure 12:
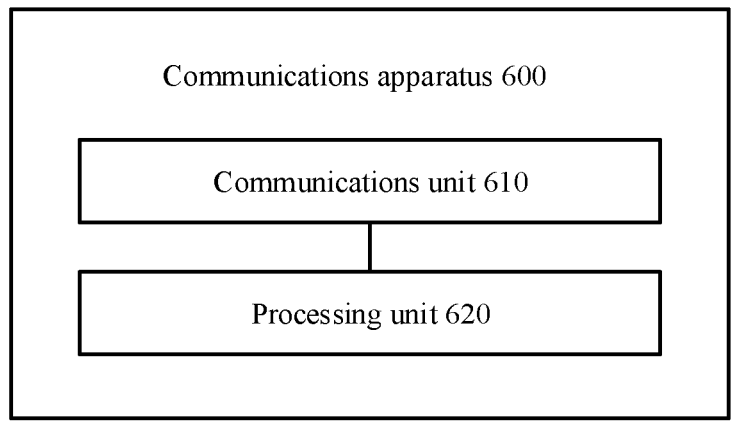
FIG. 12 is a schematic block diagram of a communications apparatus according to an embodiment of this application.

FIG. 12 is a schematic block diagram of a communications apparatus 600 according to an embodiment of this application. The apparatus 600 may correspond to the terminal device described in the method 200 and the method 300, or may be a chip or a component used in the terminal device. In addition, modules or units in the apparatus 600 are respectively configured to perform actions or processing processes performed by the terminal device in the method 200 and the method 300. As shown in FIG. 12, the communications apparatus 600 may include a communications unit 610 and a processing unit 620.

The processing unit 620 is configured to determine one or more channel occupancy times COTs.

The processing unit 620 is further configured to detect a downlink reference signal within the one or more COTs.

The processing unit 620 is further configured to determine, based on the downlink reference signal detected within the one or more COTs, whether a channel needs to be reconnected.

The communications apparatus provided in this application determines, by using the downlink reference signal detected within the COT, whether the channel needs to be reconnected, to reduce impact of LBT on the downlink reference signal in RLM, improve accuracy of the radio link monitoring performed on an unlicensed spectrum, and improve communication reliability, thereby further improving communication efficiency.

Optionally, the communications unit 610 may include a receiving unit (module) and a sending unit (module), which are configured to perform the steps of receiving and sending information by the terminal device in the method 200, the method 300, and FIG. 3 to FIG. 7. Optionally, the communications apparatus 600 may further include a storage unit 630, configured to store instructions executed by the communications unit 610 and the processing unit 620. The communications unit 610, the processing unit 620, and the storage unit 630 are in communication connection. The storage unit 630 stores the instructions. The processing unit 620 is configured to execute the instructions stored in the storage unit 630. The communications unit 610 is configured to send or receive a specific signal under driving of the processing unit 620.

The communications apparatus 600 is a communications device, or may be a chip in a communications device. When the communications apparatus is a communications device, the processing unit may be a processor, and the communications unit may be a transceiver. The communications device may further include the storage unit, and the storage unit may be a memory. The storage unit is configured to store the instructions, and the processing unit executes the instructions stored in the storage unit, so that the communications device performs the foregoing methods. When the communications apparatus is a chip in a communications device, the processing unit may be a processor, and the communications unit may be an input/output interface, a pin, a circuit, or the like. The processing unit executes the instructions stored in the storage unit, so that the communications apparatus performs operations performed by the terminal device in the method 200 and the method 300. The storage unit may be a storage unit (for example, a register or a cache) inside the chip, or may be a storage unit (for example, a read-only memory or a random access memory) that is outside the chip and that is inside the communications device.

It may be clearly understood by a person skilled in the art that, for steps performed by the communications apparatus 600 and corresponding beneficial effects, refer to the related descriptions of the terminal device in the method 200 and the method 300. For brevity, details are not described herein again.

Figure 13:
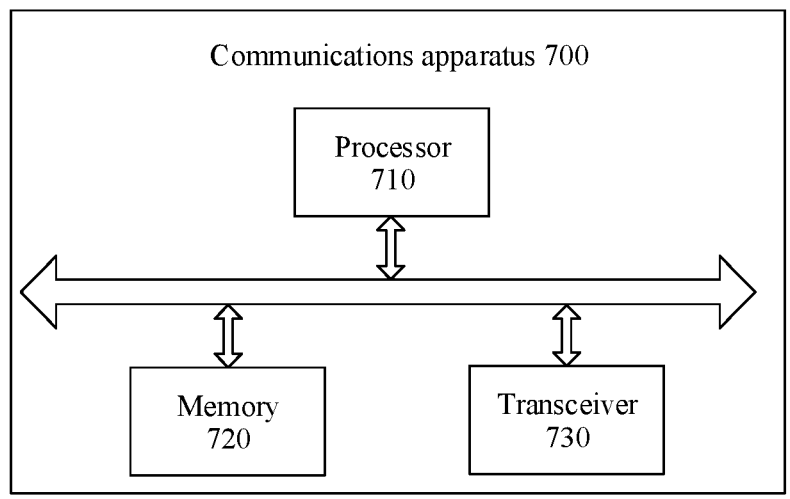
FIG. 13 is a schematic block diagram of a communications apparatus according to another embodiment of this application.

It should be understood that, the communications unit 610 may be implemented by a transceiver, and the processing unit 620 may be implemented by a processor. The storage unit may be implemented by a memory. As shown in FIG. 13, a communications apparatus 700 may include a processor 710, a memory 720, and a transceiver 730.

The communications apparatus 600 shown in FIG. 12 or the communications apparatus 700 shown in FIG. 13 can implement the steps performed by the terminal device in the method 200, the method 300, and FIG. 3 to FIG. 7. For similar descriptions, refer to the descriptions in the foregoing corresponding methods. To avoid repetition, details are not described herein again.

It should be further understood that, the communications apparatus 600 shown in FIG. 12 or the communications apparatus 700 shown in FIG. 13 may be a terminal device.

Figure 14:
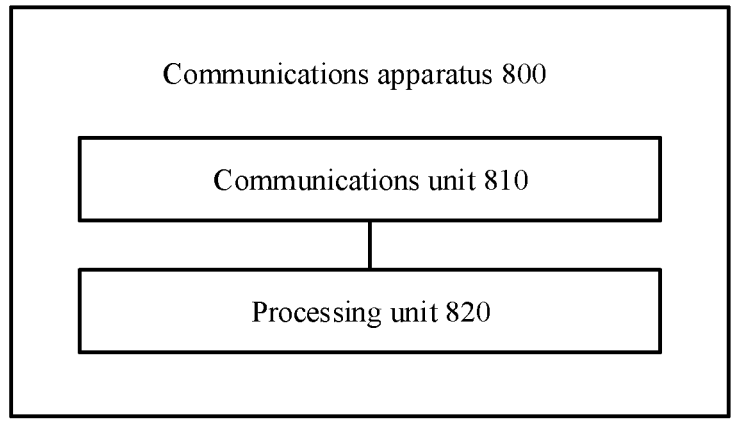
FIG. 14 is a schematic block diagram of a communications apparatus according to an embodiment of this application.

FIG. 14 is a schematic block diagram of a communications apparatus 800 according to an embodiment of this application. The apparatus 800 may correspond to the terminal device described in the method 400 and the method 500, or may be a chip or a component used in the terminal device. In addition, modules or units in the apparatus 800 are respectively configured to perform actions or processing processes performed by the terminal device in the method 400 and the method 500. As shown in FIG. 14, the communications apparatus 800 may include a communications unit 810 and a processing unit 820.

The processing unit 820 is configured to detect downlink reference signals.

The processing unit 820 is further configured to determine one or more channel occupancy times COTs.

The processing unit 820 is further configured to determine, based on the detected downlink reference signals, whether a channel needs to be reconnected, where in the detected downlink reference signals, a first downlink reference signal is located within the COT, a second downlink reference signal is located beyond the COT, and detection thresholds for the first downlink reference signal and the second downlink reference signal are different.

The communications apparatus provided in this application performs RLM by using the RSs detected within and beyond the COT, so that accuracy of the RLM can be improved, thereby further ensuring communication between the terminal device and a network device.

Optionally, the communications unit 810 may include a receiving unit (module) and a sending unit (module), which are configured to perform the steps of receiving and sending information by the terminal device in the method 400 and FIG. 8. Optionally, the communications apparatus 800 may further include a storage unit 830, configured to store instructions executed by the communications unit 810 and the processing unit 820. The communications unit 810, the processing unit 820, and the storage unit 830 are in communication connection. The storage unit 830 stores the instructions. The processing unit 820 is configured to execute the instructions stored in the storage unit 830. The communications unit 810 is configured to send or receive a specific signal under driving of the processing unit 820.

The communications apparatus 800 is a communications device, or may be a chip in a communications device. When the communications apparatus is a communications device, the processing unit may be a processor, and the communications unit may be a transceiver. The communications device may further include the storage unit, and the storage unit may be a memory. The storage unit is configured to store the instructions, and the processing unit executes the instructions stored in the storage unit, so that the communications device performs the foregoing method. When the communications apparatus is a chip in a communications device, the processing unit may be a processor, and the communications unit may be an input/output interface, a pin, a circuit, or the like. The processing unit executes the instructions stored in the storage unit, so that the communications apparatus performs operations performed by the terminal device in the method 400 and the method 500. The storage unit may be a storage unit (for example, a register or a cache) inside the chip, or may be a storage unit (for example, a read-only memory or a random access memory) that is outside the chip and that is inside the communications device.

It may be clearly understood by a person skilled in the art that, for steps performed by the communications apparatus 800 and corresponding beneficial effects, refer to the related descriptions of the terminal device in the method 400 and the method 500. For brevity, details are not described herein again.

Figure 15:
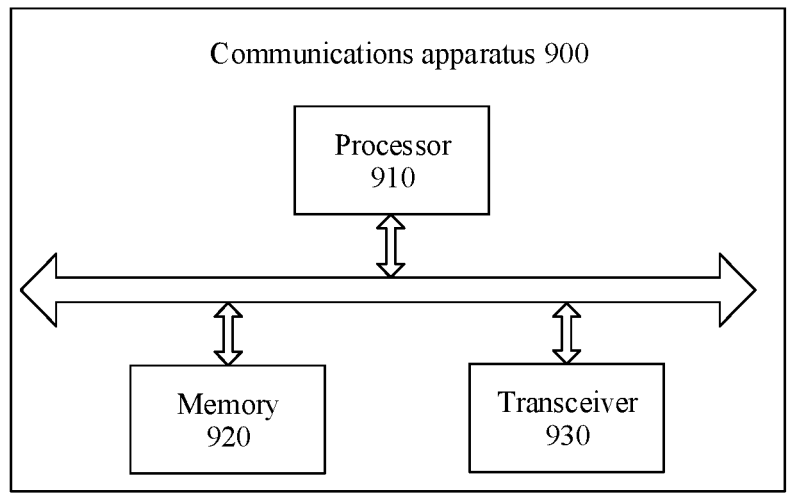
FIG. 15 is a schematic block diagram of a communications apparatus according to another embodiment of this application.

It should be understood that, the communications unit 810 may be implemented by a transceiver, and the processing unit 820 may be implemented by a processor. The storage unit may be implemented by a memory. As shown in FIG. 15, a communications apparatus 900 may include a processor 910, a memory 920, and a transceiver 930.

The communications apparatus 800 shown in FIG. 14 or the communications apparatus 900 shown in FIG. 15 can implement the steps performed by the terminal device in the method 400, the method 500, and FIG. 8 to FIG. 11. For similar descriptions, refer to the descriptions in the foregoing corresponding methods. To avoid repetition, details are not described herein again.

It should be further understood that, the communications apparatus 800 shown in FIG. 14 or the communications apparatus 900 shown in FIG. 15 may be a terminal device.

Figure 16:
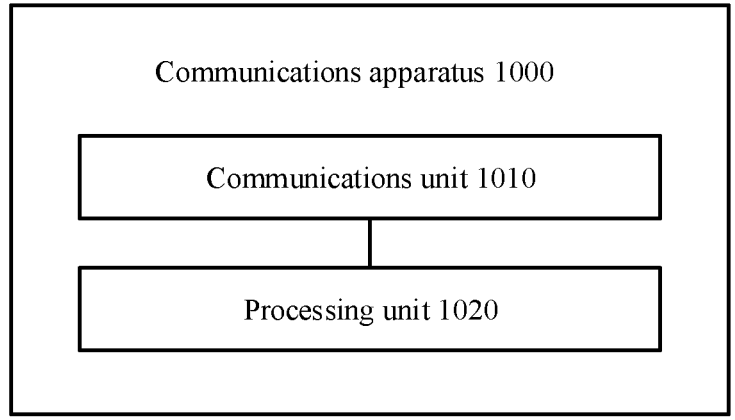
FIG. 16 is a schematic block diagram of a communications apparatus according to another embodiment of this application.

FIG. 16 is a schematic block diagram of a communications apparatus 1000 according to an embodiment of this application. The apparatus 1000 may correspond to the network device described in the method 200 to the method 500, or may be a chip or a component used in the network device. In addition, modules or units in the apparatus 1000 are respectively configured to perform actions or processing processes performed by the network device in the method 200 to the method 500. As shown in FIG. 16, the communications apparatus 1000 may include a communications unit 1010 and a processing unit 1020.

The processing unit 1020 is configured to determine one or more channel occupancy times COTs.

The processing unit 1020 is further configured to send a downlink reference signal within the one or more COTs.

The communications unit 1010 is configured to send one or more pieces of COT indication information, where the one or more pieces of COT indication information are used to indicate start and end moments of the one or more COTs.

The communications apparatus provided in this application can send the downlink reference signal and the COT indication information to a terminal device, so that accuracy of RLM performed by the terminal device can be improved, thereby ensuring communication between the terminal device and the network device.

Optionally, the communications unit 1010 may include a receiving unit (module) and a sending unit (module), which are configured to perform the steps of receiving and sending information by the network device in the method 200 to the method 500 and FIG. 2 to FIG. 11. Optionally, the communications apparatus 1000 may further include a storage unit 1030, configured to store instructions executed by the communications unit 1010 and the processing unit 1020. The communications unit 1010, the processing unit 1020, and the storage unit 1030 are in communication connection. The storage unit 1030 stores the instructions. The processing unit 1020 is configured to execute the instructions stored in the storage unit 1030. The communications unit 1010 is configured to send or receive a specific signal under driving of the processing unit 1020.

The communications apparatus 1000 is a communications device, or may be a chip in a communications device. When the communications apparatus is a communications device, the processing unit may be a processor, and the communications unit may be a transceiver. The communications device may further include the storage unit, and the storage unit may be a memory. The storage unit is configured to store the instructions, and the processing unit executes the instructions stored in the storage unit, so that the communications device performs the foregoing methods. When the communications apparatus is a chip in a communications device, the processing unit may be a processor, and the communications unit may be an input/output interface, a pin, a circuit, or the like. The processing unit executes the instructions stored in the storage unit, so that the communications apparatus performs operations performed by the network device in the method 200 to the method 500. The storage unit may be a storage unit (for example, a register or a cache) inside the chip, or may be a storage unit (for example, a read-only memory or a random access memory) that is outside the chip and that is inside the communications device.

It may be clearly understood by a person skilled in the art that, for steps performed by the communications apparatus 1000 and corresponding beneficial effects, refer to the related descriptions of the network device in the method 200 to the method 500. For brevity, details are not described herein again.

Figure 17:
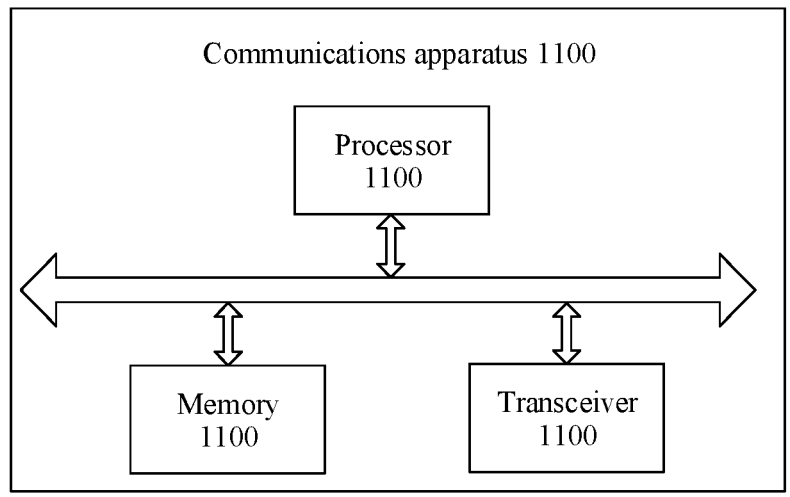
FIG. 17 is a schematic block diagram of a communications apparatus according to an embodiment of this application.

It should be understood that, the communications unit 1010 may be implemented by a transceiver, and the processing unit 1020 may be implemented by a processor. The storage unit may be implemented by a memory. As shown in FIG. 17, a communications apparatus 1100 may include a processor 1110, a memory 1120, and a transceiver 1130.

The communications apparatus 1000 shown in FIG. 16 or the communications apparatus 1100 shown in FIG. 17 can implement the steps performed by the network device in the method 200 to the method 500 and FIG. 3 to FIG. 11. For similar descriptions, refer to the descriptions in the foregoing corresponding methods. To avoid repetition, details are not described herein again.

It should be further understood that, the communications apparatus 1000 shown in FIG. 16 or the communications apparatus 1100 shown in FIG. 17 may be a network device.

The network device and the terminal device in the foregoing apparatus embodiments completely correspond to the network device and the terminal device in the method embodiments. A corresponding module or unit performs a corresponding step. For example, a transceiver unit (transceiver) performs a sending step and/or a receiving step in the method embodiments, and a step other than the sending step and the receiving step may be performed by the processing unit (processor). For a function of a specific unit, refer to the corresponding method embodiments. The sending unit and the receiving unit may form the transceiver unit, and a transmitter and a receiver may form the transceiver, to jointly implement receiving and sending functions. There may be one or more processors.

It should be understood that division of the apparatus into the units is merely division into logical functions. In an actual implementation, all or some of the units may be integrated into a physical entity, or may be physically separate. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. The processing element herein may also be referred to as a processor, and may be an integrated circuit having a signal processing capability. In an implementation process, the steps in the foregoing methods or the foregoing units may be implemented by using a hardware integrated logic circuit in the processing element, or may be implemented in a form of software invoked by the processing element.

For example, a unit in any one of the foregoing apparatuses may be one or more integrated circuits configured to implement the foregoing methods, for example, one or more application-specific integrated circuits (ASIC), one or more digital signal processors (DSP), one or more field programmable gate arrays (FPGA), or a combination of at least two of these types of integrated circuits. For another example, when a unit in the apparatus may be implemented by a processing element invoking a program, the processing element may be a general-purpose processor, for example, a central processing unit (CPU) or another processor that can invoke the program. For still another example, the units may be integrated and implemented in a form of a system-on-a-chip (SOC).

Figure 18:
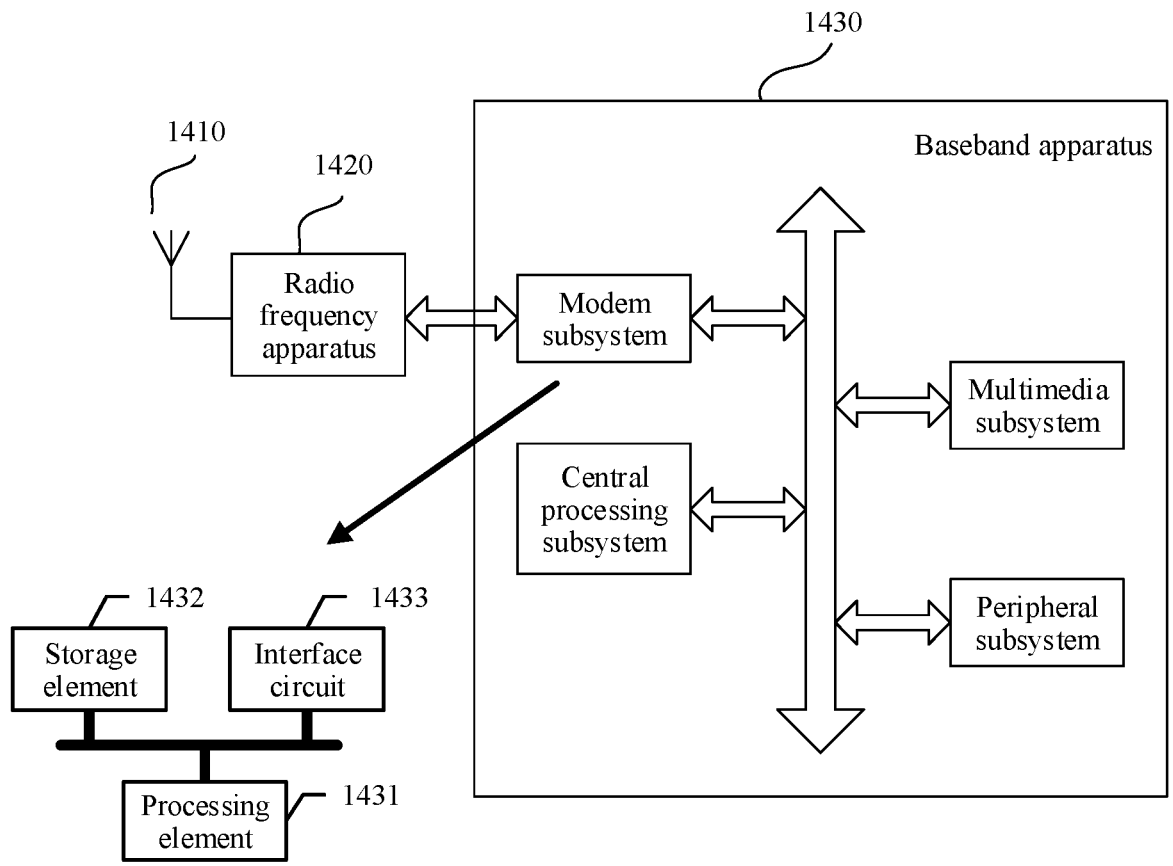
FIG. 18 is a schematic block diagram of a communications apparatus according to another embodiment of this application.

FIG. 18 is a schematic structural diagram of a terminal device according to an embodiment of this application. The terminal device may be the terminal device in the foregoing embodiments and is configured to implement operations of the terminal device in the foregoing embodiments. As shown in FIG. 18, the terminal device includes an antenna 1410, a radio frequency apparatus 1420, and a signal processing part 1430. The antenna 1410 is connected to the radio frequency apparatus 1420. In a downlink direction, the radio frequency apparatus 1420 receives, through the antenna 1410, information sent by a network device, and sends, to the signal processing part 1430 to process, the information sent by the network device. In an uplink direction, the signal processing part 1430 processes information of the terminal device, and sends the information to the radio frequency apparatus 1420. The radio frequency apparatus 1420 processes the information of the terminal device, and then sends the processed information to the network device through the antenna 1410.

The signal processing part 1430 may include a modem subsystem, configured to process data at each communications protocol layer. The signal processing part 1430 may further include a central processing subsystem, configured to implement processing of an operating system and an application layer of the terminal. In addition, the signal processing part 1430 may further include another subsystem such as a multimedia subsystem or a peripheral subsystem. The multimedia subsystem is configured to control a camera, a screen display, and the like of the terminal device, and the peripheral subsystem is configured to implement a connection to another device. The modem subsystem may be an independent chip. Optionally, the foregoing apparatus used for the terminal may be located in the modem subsystem.

The modem subsystem may include one or more processing elements 1431, for example, include one main control CPU and another integrated circuit. In addition, the modem subsystem may further include a storage element 1432 and an interface circuit 1433. The storage element 1432 is configured to store data and a program, but a program used to perform the method performed by the terminal device in the foregoing methods may not be stored in the storage element 1432, but is stored in a memory outside the modem subsystem. The interface circuit 1433 is configured to communicate with another subsystem. The foregoing apparatus used for the terminal device may be located in the modem subsystem, and the modem subsystem may be implemented by using a chip. The chip includes at least one processing element and at least one interface circuit. The processing element is configured to perform the steps in any one of the methods performed by the terminal device. The interface circuit is configured to communicate with another apparatus. In an implementation, units of the terminal device that implement the steps in the foregoing methods may be implemented by a processing element invoking a program.

For example, the apparatus used for the terminal device includes a processing element and a storage element. The processing element invokes a program stored in the storage element, to perform the methods performed by the terminal in the foregoing method embodiments. The storage element may be a storage element located on a same chip as the processing element, in other words, may be an on-chip storage element.

Figure 19:
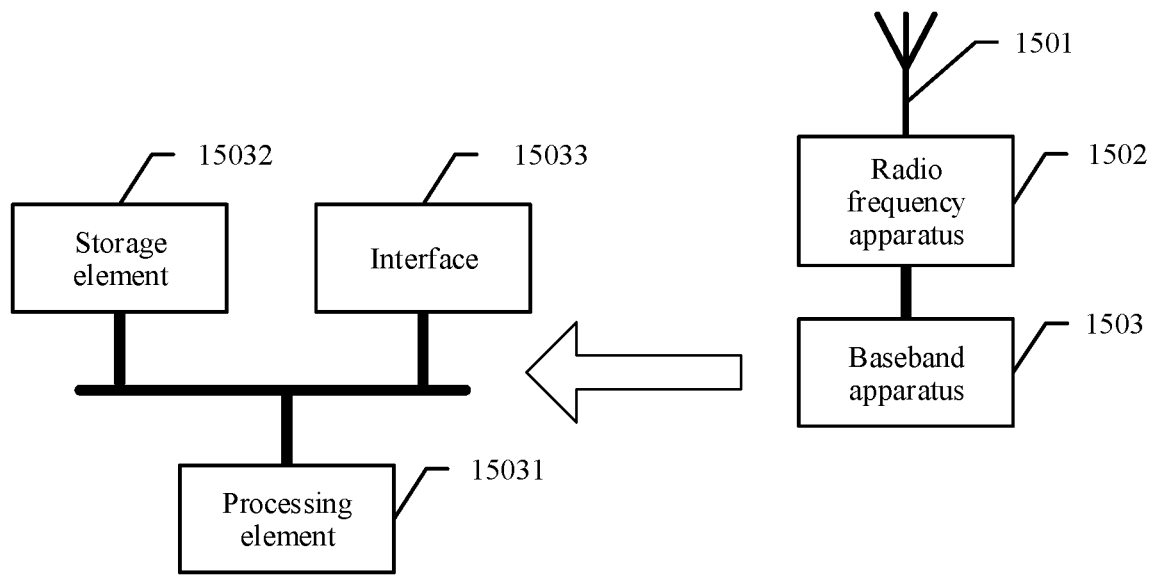
FIG. 19 is a schematic block diagram of a communications apparatus according to another embodiment of this application.

FIG. 19 is a schematic structural diagram of a network device according to an embodiment of this application. The network device is configured to implement operations of the network device in the foregoing embodiments. As shown in FIG. 19, the network device includes an antenna 1501, a radio frequency apparatus 1502, and a baseband apparatus 1503. The antenna 1501 is connected to the radio frequency apparatus 1502. In an uplink direction, the radio frequency apparatus 1502 receives, through the antenna 1501, information sent by a terminal, and sends, to the baseband apparatus 1503 to process, the information sent by the terminal device. In a downlink direction, the baseband apparatus 1503 processes information to be sent to the terminal, and sends the information to the radio frequency apparatus 1502. The radio frequency apparatus 1502 processes the information of the terminal device, and then sends the processed information to the terminal through the antenna 1501.

The baseband apparatus 1503 may include one or more processing elements 15031, for example, include one main control CPU and another integrated circuit. In addition, the baseband apparatus 1503 may further include a storage element 15032 and an interface 15033. The storage element 15032 is configured to store a program and data. The interface 15033 is configured to exchange information with the radio frequency apparatus 1502, and the interface is, for example, a common public radio interface (CPRI). The foregoing apparatus used for the network device may be located in the baseband apparatus 1503. For example, the foregoing apparatus used for the network device may be a chip on the baseband apparatus 1503. The chip includes at least one processing element and at least one interface circuit. The processing element is configured to perform the steps in any one of the methods performed by the network device. The interface circuit is configured to communicate with another apparatus. In an implementation, units of the network device that implement the steps in the foregoing methods may be implemented by a processing element invoking a program. For example, the apparatus used for the network device includes a processing element and a storage element. The processing element invokes a program stored in the storage element, to perform the methods performed by the network device in the foregoing method embodiments. The storage element may be a storage element located on a same chip as the processing element, in other words, may be an on-chip storage element, or may be a storage element located on a different chip from the processing element, in other words, may be an off-chip storage element.

The terminal device and the network device in the foregoing apparatus embodiments may completely correspond to the terminal device or the network device in the method embodiments, and a corresponding module or unit performs a corresponding step. For example, when the apparatus is implemented in a form of a chip, the receiving unit may be an interface circuit that is of the chip and that is configured to receive a signal from another chip or apparatus. The foregoing unit used for sending is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

An embodiment of this application further provides a communications system. The communications system includes the foregoing terminal device and the foregoing network device.

An embodiment of this application further provides a computer-readable medium, configured to store computer program code. The computer program code includes instructions used to perform the method for radio link monitoring on an unlicensed spectrum in the method 200 to the method 500 in the embodiments of this application. The readable medium may be a read-only memory (ROM) or a random access memory (RAM). This is not limited in this embodiment of this application.

This application further provides a computer program product. The computer program product includes instructions. When the instructions are executed, the terminal device and the network device are enabled to perform operations corresponding to the terminal device and the network device in the foregoing methods.

An embodiment of this application further provides a system chip. The system chip includes a processing unit and a communications unit. The processing unit may be, for example, a processor, and the communications unit may be, for example, an input/output interface, a pin, or a circuit. The processing unit may execute computer instructions, so that the chip in a communications apparatus performs any method for radio link monitoring on an unlicensed spectrum that is provided in the foregoing embodiments of this application.

Optionally, the computer instructions are stored in a storage unit.

Optionally, the storage unit is a storage unit inside the chip, such as a register or a cache. Alternatively, the storage unit may be a storage unit that is inside a terminal and that is located outside the chip, such as a ROM, another type of static storage device that can store static information and instructions, or a RAM. The processor mentioned in any of the foregoing descriptions may be a CPU, a microprocessor, an ASIC, or one or more integrated circuits configured to control execution of a program for the method for radio link monitoring on an unlicensed spectrum. The processing unit and the storage unit may be decoupled, separately disposed on different devices, and connected in a wired or wireless manner, to implement functions of the processing unit and the storage unit, to support the system chip in implementing various functions in the foregoing embodiments. Alternatively, the processing unit and the memory may be coupled to a same device.

It may be understood that the memory in the embodiments of this application may be a volatile memory or a nonvolatile memory, or may include a volatile memory and a nonvolatile memory. The nonvolatile memory may be a ROM, a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a RAM and is used as an external cache. There are a plurality of different types of RAMs, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synch link DRAM, SLDRAM), and a direct rambus random access memory.

The terms "system" and "network" may be used interchangeably in this specification. The term "and/or" in this specification describes only an association relationship for associated objects and represents that three relationships may exist. For example, A and/or B may represent the following three cases: Only A exists, both A and B exist, and only B exists. In addition, the character "/" in this specification generally indicates an "or" relationship between the associated objects.

The terms "uplink" and "downlink" in this application are used to describe a data/information transmission direction in a specific scenario. For example, an "uplink" direction is usually a direction in which data/information is transmitted from a terminal to a network side, or a direction in which data/information is transmitted from a distributed unit to a centralized unit, and a "downlink" direction is usually a direction in which data/information is transmitted from a network side to a terminal, or a direction in which data/information is transmitted from a centralized unit to a distributed unit. It may be understood that the terms "uplink" and "downlink" are only used to describe the data/information transmission direction, and neither a specific start device nor a specific end device of the data/information transmission is limited.

Names may be assigned to various objects that may appear in this application, for example, various messages/information/devices/network elements/systems/apparatuses/action s/operations/procedures/concepts. It may be understood that these specific names do not constitute a limitation on the related objects, and the assigned names may change with a factor such as a scenario, a context, or a use habit. Understanding of technical meanings of technical terms in this application should be determined mainly based on functions and technical effects that are reflected/performed by the technical terms in the technical solutions.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the division into units is merely division into logical functions and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of the embodiments.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for radio link monitoring on an unlicensed spectrum, wherein the method is applied to a terminal device, the method comprises:
   determining one or more channel occupancy times (COTs);
   detecting a downlink reference signal within the one or more COTs; and
   determining, based on the downlink reference signal detected within the one or more COTs, whether a connection needs to be reestablished on a channel that needs to be reconnected, wherein the determining whether the connection needs to be reestablished on the channel comprises:
   in response to a downlink reference signal whose quality is less than a first detection threshold being detected for a first time, starting a first timer and a second timer, and starting an out-of-synchronization (OOS) counter, wherein the OOS counter is used to determine a start moment of a third timer, and a duration of the second timer is greater than a duration of the first timer;
   by a moment at which the first timer expires, and in response to no downlink reference signal being detected within the one or more COTs, updating a value of the OOS counter, and resetting the first timer; and in response to a downlink reference signal whose quality being less than the first detection threshold is detected, updating the value of the OOS counter, and resetting the first timer;
   starting the third timer in response to the value of the OOS counter becoming a preset threshold;
   updating, before the third timer expires, a value of an in-synchronization indication (IS) counter based on the downlink reference signal being detected within the one or more COTs; and
   determining, based on the value of the IS counter, whether the channel needs to be reconnected.

2. The method according to claim 1, wherein the determining whether the connection needs to be reestablished on the channel comprises:
   in response to a downlink reference signal whose quality is less than a first detection threshold being detected for the first time, starting a second timer, and starting an out-of-synchronization (OOS) counter, wherein the OOS counter is used to determine a start moment of a third timer;
   updating a value of the OOS counter based on the downlink reference signal detected within the one or more COTs;
   starting the third timer in response to the value of the OOS counter becoming a preset threshold;
   updating, before the third timer expires, a value of an in-synchronization (IS) indication counter based on the downlink reference signal detected within the one or more COTs; and
   determining, based on the value of the IS counter, whether the channel needs to be reconnected.

3. The method according to claim 2, wherein the updating the value of the OOS counter based on the downlink reference signal detected within the one or more COTs comprises:
- by a moment at which the second timer expires, in response to a downlink reference signal whose quality is less than the first detection threshold being detected within the one or more COTs, updating the value of the OOS counter; and in response to a downlink reference signal whose quality is greater than or equal to the first detection threshold being detected within the one or more COTs, resetting the second timer, and resetting the OOS counter.

4. The method according to claim 1, further comprising: after the first timer is started, in response to a downlink reference signal whose quality is greater than or equal to the first detection threshold being detected within the COT, resetting the first timer and the second timer, and resetting the OOS counter.

5. The method according to claim 1, wherein the updating, before the third timer expires, the value of the IS counter comprises:
- before the third timer expires, in response to a downlink reference signal whose quality is greater than or equal to the first detection threshold being detected within the one or more COTs, updating the value of the IS counter; and
- before the third timer expires, in response to a downlink reference signal whose quality is less than the first detection threshold being detected within the one or more COTs, resetting the IS counter.

6. The method according to claim 1, wherein the determining whether the connection needs to be reestablished on the channel comprises:
- starting a second timer in response to a downlink reference signal whose quality is less than a first detection threshold being detected within the one or more COTs;
- before the second timer expires, determining a first downlink reference signal that is in the downlink reference signal detected within the one or more COTs and whose quality is less than the first detection threshold; and
- determining, based on a quantity of first downlink reference signals, whether to start a third timer.

7. The method according to claim 6, wherein after the third timer is started, the method further comprises:
- before the third timer expires, determining a second downlink reference signal that is in the downlink reference signal detected within the one or more COTs and whose quality is greater than or equal to the first detection threshold; and
- determining, based on a quantity of second downlink reference signals, whether the channel needs to be reconnected.

8. The method according to claim 1, wherein the updating the value of the OOS counter comprises increasing the value of the OOS counter by 1; and
- in response to the downlink reference signal detected within the one or more COTs comprising a preconfigured downlink reference signal and a downlink reference signal that being comprised in a discovery reference signal (DRS), the updating a value of the OOS counter based on the downlink reference signal detected within the one or more COTs comprises:
- increasing the value of the OOS counter by 1 in response to L downlink reference signals that are comprised in the DRS and whose quality is less than a third detection threshold being continuously detected within the one or more COTs; and
- increasing the value of the OOS counter by 1 in response to P first downlink reference signals whose quality is less than the first detection threshold being continuously detected within the one or more COTs, wherein both P and L are positive integers, and P is greater than or equal to L.

9. The method according to claim 1, further comprising:
- receiving one or more pieces of COT indication information, wherein the one or more pieces of COT indication information are used to indicate start and end moments of the one or more COTs.

10. A method for radio link monitoring on an unlicensed spectrum, wherein the method is applied to a terminal device, and the method comprises:
- detecting downlink reference signals;
- determining one or more channel occupancy times (COTs); and
- determining, based on the detected downlink reference signals, whether a channel needs to be reconnected, wherein in the detected downlink reference signals, a first downlink reference signal is located within the one or more COTs, a second downlink reference signal is located beyond the one or more COTs, and detection thresholds for the first downlink reference signal and the second downlink reference signal are different.

11. The method according to claim 10, wherein the determining whether the connection needs to be reestablished on the channel comprises:
- in response to quality of a downlink reference signal detected for the first time being less than the detection threshold, starting a first timer and a second timer, and starting an out-of-synchronization (OOS) counter, wherein the OOS counter is used to determine a start moment of a third timer, duration of the second timer is greater than duration of the first timer, the detection threshold for the first downlink reference signal is a first detection threshold, the detection threshold for the second downlink reference signal is a second detection threshold, and the first detection threshold is not equal to the second detection threshold;
- updating a value of the OOS counter based on the first downlink reference signal and the second downlink reference signal;
- starting the third timer in response to the value of the OOS counter becoming a preset threshold;
- updating a value of an in-synchronization indication (IS) counter based on the first downlink reference signal and the second downlink reference signal before the third timer expires; and
- determining, based on the value of the IS counter, whether the channel needs to be reconnected.

12. The method according to claim 11, wherein the updating the value of the OOS counter comprises:
- by a moment at which the first timer expires, in response to no first downlink reference signal being detected within the COT, updating the value of the OOS counter, and resetting the first timer, and in response to a first downlink reference signal whose quality is less than the first detection threshold being detected within the COT, updating the value of the OOS counter, and resetting the first timer; or in response to no second downlink reference signal is detected beyond the COT, updating the value of the OOS counter, and resetting the first timer, and in response to a second downlink reference signal whose quality is less than the second detection threshold being detected beyond the COT, updating the value of the OOS counter, and resetting the first timer; and in response to a first downlink reference signal whose quality is greater than or equal to the first detection threshold being detected within the COT, resetting the first timer and the second timer, and resetting the OOS counter; or in response to a second downlink reference signal whose quality is greater than or equal to the second detection threshold being detected beyond the COT, resetting the first timer and the second timer, and resetting the OOS counter.

13. The method according to claim 10, wherein the determining whether the connection needs to be reestablished on the channel comprises:

in response to quality of a downlink reference signal detected for the first time being less than the detection threshold, starting a second timer, and starting an out-of-synchronization (OOS) counter, wherein the OOS counter is used to determine a start moment of a third timer, the detection threshold for the first downlink reference signal is a first detection threshold, the detection threshold for the second downlink reference signal is a second detection threshold, and the first detection threshold is not equal to the second detection threshold;

updating a value of the OOS counter based on the first downlink reference signal and the second downlink reference signal;

starting the third timer when the value of the OOS counter becomes a preset threshold;

updating a value of an in-synchronization indication (IS) counter based on the first downlink reference signal and the second downlink reference signal before the third timer expires; and determining, based on the value of the IS counter, whether the channel needs to be reconnected.

14. The method according to claim 13, wherein the updating the value of the OOS counter comprises:

by a moment at which the second timer expires, in response to a first downlink reference signal whose quality is less than the first detection threshold being detected within the COT, updating the value of the OOS counter; or in response to a second downlink reference signal whose quality is less than the second detection threshold being detected beyond the COT, updating the value of the OOS counter; and in response to a first downlink reference signal whose quality is greater than or equal to the first detection threshold being detected within the COT, resetting the second timer, and resetting the OOS counter; or in response to a second downlink reference signal whose quality is greater than or equal to the second detection threshold being detected beyond the COT, resetting the second timer, and resetting the OOS counter.

15. The method according to claim 11, wherein the updating the value of the OOS counter comprises:

increasing the value of the OOS counter by 1 in response to N first downlink reference signals whose quality is less than the first detection threshold being continuously detected; and increasing the value of the OOS counter by 1 in response to M second downlink reference signals whose quality is less than the second detection threshold being continuously detected, wherein both M and N are positive integers, and M is greater than or equal to N.

16. The method according to claim 11, wherein the updating the value of the IS counter before the third timer expires comprises:

before the third timer expires, in response to a first downlink reference signal whose quality is less than the first detection threshold being detected, resetting the IS counter; or in response to a second downlink reference signal whose quality is less than the second detection threshold being detected, resetting the IS counter;

increasing the value of the IS counter by 1 in response to W first downlink reference signals whose quality is greater than or equal to the first detection threshold being continuously detected before the third timer expires; and increasing the value of the IS counter by 1 in response to Y second downlink reference signals whose quality is greater than or equal to the second detection threshold being continuously detected before the third timer expires, wherein both W and Y are positive integers, and W is less than or equal to Y.

17. The method according to claim 11, wherein the updating the value of the OOS counter comprises increasing the value of the OOS counter by 1; and the downlink reference signals further comprise a third downlink reference signal comprised in a discovery reference signal (DRS), and the updating the value of the OOS counter comprises:

increasing the value of the OOS counter by 1 in response to L downlink reference signals that are comprised in the DRS and whose quality is less than a third detection threshold being detected;

increasing the value of the OOS counter by 1 in response to P first downlink reference signals whose quality is less than the first detection threshold being continuously detected; and increasing the value of the OOS counter by 1 in response to R second downlink reference signals whose quality is less than the second detection threshold being continuously detected, wherein R, P, and L are all positive integers, P is greater than or equal to L, and R is greater than or equal to P.

18. The method according to claim 10, further comprising:

receiving one or more pieces of COT indication information, wherein the one or more pieces of COT indication information indicates start and end moments of the one or more COTs.

19. A terminal device for radio link monitoring on an unlicensed spectrum comprising:

a processor; and a non-transitory storage medium having processor executable instructions stored thereon which, when executed by the processor, causes the terminal device to:

detect downlink reference signals;

determine one or more channel occupancy times (COTs); and determine, based on the detected downlink reference signals, whether a channel needs to be reconnected, wherein in the detected downlink reference signals, a first downlink reference signal is located within the one or more COTs, a second downlink reference signal is located beyond the one or more COTs, and detection thresholds for the first downlink reference signal and the second downlink reference signal are different.

20. The terminal device of claim 19, wherein the determining whether the connection needs to be reestablished comprises:
- in response to quality of a downlink reference signal detected for the first time being less than the detection threshold, start a first timer and a second timer, and start an out-of-synchronization (OOS) counter, wherein the OOS counter is used to determine a start moment of a third timer, duration of the second timer is greater than duration of the first timer, the detection threshold for the first downlink reference signal is a first detection threshold, the detection threshold for the second downlink reference signal is a second detection threshold, and the first detection threshold is not equal to the second detection threshold;
- update a value of the OOS counter based on the first downlink reference signal and the second downlink reference signal;
- start the third timer in response to the value of the OOS counter becoming a preset threshold;
- update a value of an in-synchronization indication (IS) counter based on the first downlink reference signal and the second downlink reference signal before the third timer expires; and
- determine, based on the value of the IS counter, whether the channel needs to be reconnected.

\* \* \* \* \*